United States Patent
Lim et al.

(10) Patent No.: US 12,432,664 B2
(45) Date of Patent: Sep. 30, 2025

(54) MAXIMIZING AN AMOUNT OF DEGRADATION FOR THE NR OPERATING BAND BASED ON CHANNEL BANDWIDTH

(71) Applicant: LG ELECTRONICS INC., Seoul (KR)

(72) Inventors: Suhwan Lim, Seoul (KR); Yoonoh Yang, Seoul (KR); Sangwook Lee, Seoul (KR); Jaehyuk Jang, Seoul (KR); Jinyup Hwang, Seoul (KR); Jinwoong Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 791 days.

(21) Appl. No.: 17/712,029

(22) Filed: Apr. 1, 2022

(65) Prior Publication Data

US 2022/0330169 A1 Oct. 13, 2022

(30) Foreign Application Priority Data

Apr. 2, 2021 (KR) .................. 10-2021-0043048
Aug. 6, 2021 (KR) .................. 10-2021-0103869

(51) Int. Cl.
*H04B 17/20* (2015.01)
*H04L 5/00* (2006.01)
(Continued)

(52) U.S. Cl.
CPC ........ *H04W 52/241* (2013.01); *H04B 17/203* (2023.05); *H04L 5/0092* (2013.01); *H04L 5/14* (2013.01); *H04L 41/5025* (2013.01); *H04W 36/0066* (2013.01); *H04W 52/14* (2013.01); *H04W 52/367* (2013.01);
(Continued)

(58) Field of Classification Search
CPC ........... H04W 72/1273; H04W 74/006; H04W 52/14; H04W 36/0066; H04B 17/203; H04B 7/15557; H04L 41/5025
See application file for complete search history.

(56) References Cited

U.S. PATENT DOCUMENTS 10,015,070 B1 * 7/2018 Cai ................. H04W 36/00837
2018/0091186 A1 3/2018 Lim et al.
(Continued)

FOREIGN PATENT DOCUMENTS

WO 2020197129 10/2020
WO 2020201617 10/2020

OTHER PUBLICATIONS

ETSI, "TS 138 101-1 V16.5.0", Nov. 2020, pp. 1-437 (Year: 2020).*
(Continued)

*Primary Examiner* — Salvador E Rivas
(74) *Attorney, Agent, or Firm* — LEE, HONG, DEGERMAN, KANG & WAIMEY

(57) ABSTRACT

There is provided a UE for performing communication, the UE comprising: at least one transceiver; at least one processor configured to use CA based on two NR operating bands; and at least one computer memory operably connectable to the at least one processor and storing instructions that, based on being executed by the at least one processor, perform operations comprising: transmitting an uplink signal based on NR operating band n1 or n3; receiving a downlink signal based on the NR operating band n1 or n3.

9 Claims, 12 Drawing Sheets

(51) Int. Cl.
    *H04L 5/14*     (2006.01)
    *H04L 41/5025*     (2022.01)
    *H04W 36/00*     (2009.01)
    *H04W 52/14*     (2009.01)
    *H04W 52/24*     (2009.01)
    *H04W 52/36*     (2009.01)
    *H04B 7/155*     (2006.01)
    *H04W 72/1273*     (2023.01)
    *H04W 74/00*     (2009.01)

(52) U.S. Cl.
    CPC ..... *H04B 7/15557* (2013.01); *H04W 72/1273* (2013.01); *H04W 74/006* (2013.01)

(56) References Cited

U.S. PATENT DOCUMENTS

| | | | |
|---|---|---|---|
| 2018/0220295 A1* | 8/2018 | Takahashi | H04W 72/20 |
| 2019/0158137 A1* | 5/2019 | Brunel | H04B 1/04 |
| 2019/0394779 A1* | 12/2019 | Guan | H04W 74/0833 |

OTHER PUBLICATIONS

ETSI, "TS 138 521-3 V16.6.0", Jan. 2021, pp. 1-713 (Year: 2021).*
3rd Generation Partnership Project (3GPP), "Technical Specification Group Radio Access Network; NR; User Equipment (UE) radio transmission and reception; Part 1: Range 1 Standalone (Release 17)," 3GPP TS 38.101-1 V17.0.0, Jan. 12, 2021, 490 pages.
PCT International Application No. PCT/KR2022/004719, International Search Report dated Jun. 30, 2022, 3 pages.
European Patent Office Application Serial No. 22781697.2, Search Report dated Dec. 23, 2024, 9 pages.
3rd Generation Partnership Project (3GPP), "Technical Specification Group Radio Access Network; NR; User Equipment (UE) radio transmission and reception; Part 3: Range 1 and Range 2 Interworking operation with other radios (Release 16)," 3GPP TS 38.101-3 V17.0.0, Dec. 2020, 664 pages.
LG Electronics, "TP on MSD test results for Power Class 2 UE for DC (1 LTE FDD band +1 NR TDD band) Ue," 3GPP TSG RAN WG4 Meeting #98-e, R4-2100286, Jan. 2021, 6 pages.
ZTE Corporation, "Discussion on PC2 inter-band NR CA," 3GPP TSG-RAN WG4 Meeting #96-e, R4-2010634, Aug. 2020, 7 pages.

* cited by examiner

MAXIMIZING AN AMOUNT OF DEGRADATION FOR THE NR OPERATING BAND BASED ON CHANNEL BANDWIDTH

CROSS-REFERENCE TO RELATED APPLICATIONS

Pursuant to 35 U.S.C. § 119(a), this application claims the benefit of earlier filing date and right of priority to Korean Patent Application Nos. 10-2021-0043048, filed on Apr. 2, 2021, and 10-2021-0103869, filed on Aug. 6, 2021, the contents of which are hereby incorporated by reference herein in their entirety.

TECHNICAL FIELD

The present disclosure relates to mobile communication.

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

Conventionally, for power class 2 User Equipment (UE), the impact of self-interference on Frequency division duplex (FDD) band has not been analyzed.

For example, Standard specifications for high power terminals (e.g. power class 2 UE) in FDD band are being discussed. High power terminals are not allowed to perform communication based on the current FDD band. Additionally, in FDD band, due to the characteristics of the FDD band, Tx/Rx is being simultaneously full duplexed through a specific frequency separation.

However, when power boosting of 3 dB or more is allowed, linearity at high power in the duplexer is broken, and a leakage component due to high power in Tx affects the Rx band. Herein, "power boosting of 3 dB" occurs because maximum output power of the power class 2 is 3 dB bigger than maximum output power of conventional power class 3. So, in order to maintain the sensitivity standard of the existing terminal or in order to minimize the effect of standard relaxation, it is necessary to improve the characteristics of elements such as duplexer/Power amplifier (PA) and Radio Frequency Integrated Circuits (RFIC), and/or it is necessary to analyze the degree of reception sensitivity relaxation in the case where desensing occurs.

Also, in case of a terminal supporting n3 operating band of NR, when wide Channel Bandwidth (CBW) is used, the frequency separation distance between UL and DL is short. So that Counter Intermodulation Distortion (CIMD)5, generated by the transmission signal and DC, affects the receiving end of band n3. An analysis of sensitivity degradation was added to relax the reception sensitivity of PC2 terminal by CIMD5. However, effect of CIMD5 in operating band n3 was not discussed.

SUMMARY

Accordingly, a disclosure of the present specification has been made in an effort to solve the aforementioned problem.

In accordance with an embodiment of the present disclosure, a disclosure of the present specification provides a UE for performing communication, the UE comprising: at least one transceiver; at least one processor configured to use CA based on two NR operating bands; and at least one computer memory operably connectable to the at least one processor and storing instructions that, based on being executed by the at least one processor, perform operations comprising: transmitting an uplink signal based on NR operating band n1 or n3; receiving a downlink signal based on the NR operating band n1 or n3.

In accordance with an embodiment of the present disclosure, a disclosure of the present specification provides a method for performing communication, the method performed by a UE. The method comprises: transmitting an uplink signal based on NR operating band n1 or n3; receiving a downlink signal based on the NR operating band n1 or n3.

In accordance with an embodiment of the present disclosure, a disclosure of the present specification provides a wireless communication device operating in a wireless communication system, the wireless communication device comprising: at least processor, and at least one computer memory operably connectable to the at least one processor, wherein the at least one processor is configured to perform operations comprising: generating an uplink signal based on NR operating band n1 or n3; identifying a downlink signal based on the NR operating band n1 or n3.

In accordance with an embodiment of the present disclosure, a disclosure of the present specification provides At least one computer readable medium (CRM) storing instructions that, based on being executed by at least one processor, perform operations comprising: generating an uplink signal based on NR operating band n1 or n3; identifying a downlink signal based on the NR operating band n1 or n3.

According to a disclosure of the present disclosure, the above problem of the related art is solved.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

DESCRIPTION OF EXEMPLARY EMBODIMENTS

Figure 1:
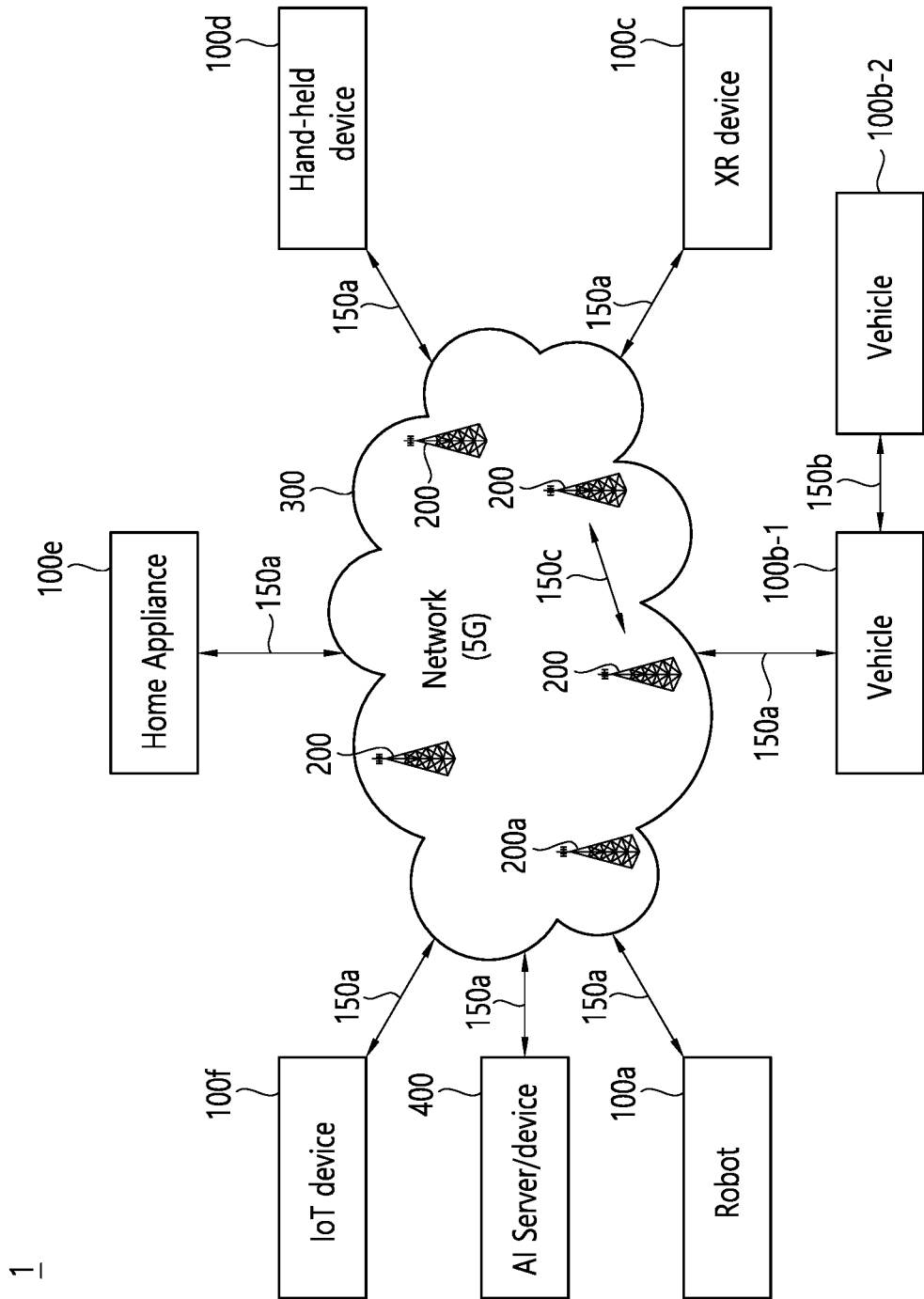
FIG. 1 shows an example of a communication system to which implementations of the present disclosure is applied.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. Evolution of 3GPP LTE includes LTE-A (advanced), LTE-A Pro, and/or 5G NR (new radio).

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDCCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

FIG. 1 shows an example of a communication system to which implementations of the present disclosure is applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced mobile broadband (eMBB), (2) a category of massive machine type communication (mMTC), and (3) a category of ultra-reliable and low latency communications (URLLC).

Partial use cases may require a plurality of categories for optimization and other use cases may focus only upon one key performance indicator (KPI). 5G supports such various use cases using a flexible and reliable method.

eMBB far surpasses basic mobile Internet access and covers abundant bidirectional work and media and entertainment applications in cloud and augmented reality. Data is one of 5G core motive forces and, in a 5G era, a dedicated voice service may not be provided for the first time. In 5G, it is expected that voice will be simply processed as an application program using data connection provided by a communication system. Main causes for increased traffic volume are due to an increase in the size of content and an increase in the number of applications requiring high data transmission rate. A streaming service (of audio and video), conversational video, and mobile Internet access will be more widely used as more devices are connected to the Internet. These many application programs require connectivity of an always turned-on state in order to push real-time information and alarm for users. Cloud storage and applications are rapidly increasing in a mobile communication platform and may be applied to both work and entertainment. The cloud storage is a special use case which accelerates growth of uplink data transmission rate. 5G is also used for remote work of cloud. When a tactile interface is used, 5G demands much lower end-to-end latency to maintain user good experience. Entertainment, for example, cloud gaming and video streaming, is another core element which increases demand for mobile broadband capability. Entertainment is essential for a smartphone and a tablet in any place including high mobility environments such as a train, a vehicle, and an airplane. Other use cases are augmented reality for entertainment and information search. In this case, the augmented reality requires very low latency and instantaneous data volume.

In addition, one of the most expected 5G use cases relates a function capable of smoothly connecting embedded sensors in all fields, i.e., mMTC. It is expected that the number of potential Internet-of-things (IoT) devices will reach 204 hundred million up to the year of 2020. An industrial IoT is one of categories of performing a main role enabling a smart city, asset tracking, smart utility, agriculture, and security infrastructure through 5G.

URLLC includes a new service that will change industry through remote control of main infrastructure and an ultra-reliable/available low-latency link such as a self-driving vehicle. A level of reliability and latency is essential to control a smart grid, automatize industry, achieve robotics, and control and adjust a drone.

5G is a means of providing streaming evaluated as a few hundred megabits per second to gigabits per second and may complement fiber-to-the-home (FTTH) and cable-based broadband (or DOCSIS). Such fast speed is needed to deliver TV in resolution of 4K or more (6K, 8K, and more), as well as virtual reality and augmented reality. Virtual reality (VR) and augmented reality (AR) applications include almost immersive sports games. A specific application program may require a special network configuration. For example, for VR games, gaming companies need to incorporate a core server into an edge network server of a network operator in order to minimize latency.

Automotive is expected to be a new important motivated force in 5G together with many use cases for mobile communication for vehicles. For example, entertainment for passengers requires high simultaneous capacity and mobile broadband with high mobility. This because future users continue to expect connection of high quality regardless of their locations and speeds. Another use case of an automotive field is an AR dashboard. The AR dashboard causes a driver to identify an object in the dark in addition to an object seen from a front window and displays a distance from the object and a movement of the object by overlapping information talking to the driver. In the future, a wireless module enables communication between vehicles, information exchange between a vehicle and supporting infrastructure, and information exchange between a vehicle and other connected devices (e.g., devices accompanied by a pedestrian). A safety system guides alternative courses of a behavior so that a driver may drive more safely drive, thereby lowering the danger of an accident. The next stage will be a remotely controlled or self-driven vehicle. This requires very high reliability and very fast communication between different self-driven vehicles and between a vehicle and infrastructure. In the future, a self-driven vehicle will perform all driving activities and a driver will focus only upon abnormal traffic that the vehicle cannot identify. Technical requirements of a self-driven vehicle demand ultra-low latency and ultra-high reliability so that traffic safety is increased to a level that cannot be achieved by human being.

A smart city and a smart home/building mentioned as a smart society will be embedded in a high-density wireless sensor network. A distributed network of an intelligent sensor will identify conditions for costs and energy-efficient maintenance of a city or a home. Similar configurations may be performed for respective households. All of temperature sensors, window and heating controllers, burglar alarms, and home appliances are wirelessly connected. Many of these sensors are typically low in data transmission rate, power, and cost. However, real-time HD video may be demanded by a specific type of device to perform monitoring.

Consumption and distribution of energy including heat or gas is distributed at a higher level so that automated control of the distribution sensor network is demanded. The smart grid collects information and connects the sensors to each other using digital information and communication technology so as to act according to the collected information. Since this information may include behaviors of a supply company and a consumer, the smart grid may improve distribution of fuels such as electricity by a method having efficiency, reliability, economic feasibility, production sustainability, and automation. The smart grid may also be regarded as another sensor network having low latency.

Mission critical application (e.g., e-health) is one of 5G use scenarios. A health part contains many application programs capable of enjoying benefit of mobile communication. A communication system may support remote treatment that provides clinical treatment in a faraway place. Remote treatment may aid in reducing a barrier against distance and improve access to medical services that cannot be continuously available in a faraway rural area. Remote treatment is also used to perform important treatment and save lives in an emergency situation. The wireless sensor network based on mobile communication may provide remote monitoring and sensors for parameters such as heart rate and blood pressure.

Wireless and mobile communication gradually becomes important in the field of an industrial application. Wiring is high in installation and maintenance cost. Therefore, a possibility of replacing a cable with re-constructible wireless links is an attractive opportunity in many industrial fields. However, in order to achieve this replacement, it is necessary for wireless connection to be established with latency, reliability, and capacity similar to those of the cable and management of wireless connection needs to be simplified. Low latency and a very low error probability are new requirements when connection to 5G is needed.

Logistics and freight tracking are important use cases for mobile communication that enables inventory and package tracking anywhere using a location-based information system. The use cases of logistics and freight typically demand low data rate but require location information with a wide range and reliability.

Referring to FIG. 1, the communication system 1 includes wireless devices 100*a* to 100*f*, base stations (BSs) 200, and a network 300. Although FIG. 1 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100a to 100f represent devices performing communication using radio access technology (RAT) (e.g., 5G new RAT (NR)) or LTE) and may be referred to as communication/radio/5G devices. The wireless devices 100a to 100f may include, without being limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an AR/VR/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100a to 100f may be called user equipments (UEs). A UE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The UAV may be, for example, an aircraft aviated by a wireless control signal without a human being onboard.

The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet.

The public safety device may include, for example, an image relay device or an image device that is wearable on the body of a user.

The MTC device and the IoT device may be, for example, devices that do not require direct human intervention or manipulation. For example, the MTC device and the IoT device may include smartmeters, vending machines, thermometers, smartbulbs, door locks, or various sensors.

The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure.

The security device may be, for example, a device installed to prevent a danger that may arise and to maintain safety. For example, the security device may be a camera, a closed-circuit TV (CCTV), a recorder, or a black box.

The FinTech device may be, for example, a device capable of providing a financial service such as mobile payment. For example, the FinTech device may include a payment device or a point of sales (POS) system.

The weather/environment device may include, for example, a device for monitoring or predicting a weather/environment.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the BSs 200/network 300, the wireless devices 100a to 100f may perform direct communication (e.g., sidelink communication) with each other without passing through the BSs 200/network 300. For example, the vehicles 100b-1 and 100b-2 may perform direct communication (e.g., vehicle-to-vehicle (V2V)/vehicle-to-everything (V2X) communication). The IoT device (e.g., a sensor) may perform direct communication with other IoT devices (e.g., sensors) or other wireless devices 100a to 100f.

Wireless communication/connections 150a, 150b and 150c may be established between the wireless devices 100a to 100f and/or between wireless device 100a to 100f and BS 200 and/or between BSs 200. Herein, the wireless communication/connections may be established through various RATs (e.g., 5G NR) such as uplink/downlink communication 150a, sidelink communication (or device-to-device (D2D) communication) 150b, inter-base station communication 150c (e.g., relay, integrated access and backhaul (IAB)), etc. The wireless devices 100a to 100f and the BSs 200/the wireless devices 100a to 100f may transmit/receive radio signals to/from each other through the wireless communication/connections 150a, 150b and 150c. For example, the wireless communication/connections 150a, 150b and 150c may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

AI refers to the field of studying artificial intelligence or the methodology that can create it, and machine learning refers to the field of defining various problems addressed in the field of AI and the field of methodology to solve them.

Machine learning is also defined as an algorithm that increases the performance of a task through steady experience on a task.

Robot means a machine that automatically processes or operates a given task by its own ability. In particular, robots with the ability to recognize the environment and make self-determination to perform actions can be called intelligent robots. Robots can be classified as industrial, medical, home, military, etc., depending on the purpose or area of use. The robot can perform a variety of physical operations, such as moving the robot joints with actuators or motors. The movable robot also includes wheels, brakes, propellers, etc., on the drive, allowing it to drive on the ground or fly in the air.

Autonomous driving means a technology that drives on its own, and autonomous vehicles mean vehicles that drive without user's control or with minimal user's control. For example, autonomous driving may include maintaining lanes in motion, automatically adjusting speed such as adaptive cruise control, automatic driving along a set route, and automatically setting a route when a destination is set. The vehicle covers vehicles equipped with internal combustion engines, hybrid vehicles equipped with internal combustion engines and electric motors, and electric vehicles equipped with electric motors, and may include trains, motorcycles, etc., as well as cars. Autonomous vehicles can be seen as robots with autonomous driving functions.

Extended reality is collectively referred to as VR, AR, and MR. VR technology provides objects and backgrounds of real world only through computer graphic (CG) images. AR technology provides a virtual CG image on top of a real object image. MR technology is a CG technology that combines and combines virtual objects into the real world. MR technology is similar to AR technology in that they show real and virtual objects together. However, there is a difference in that in AR technology, virtual objects are used as complementary forms to real objects, while in MR technology, virtual objects and real objects are used as equal personalities.

NR supports multiples numerologies (and/or multiple subcarrier spacings (SCS)) to support various 5G services. For example, if SCS is 15 kHz, wide area can be supported in traditional cellular bands, and if SCS is 30 kHz/60 kHz, dense-urban, lower latency, and wider carrier bandwidth can be supported. If SCS is 60 kHz or higher, bandwidths greater than 24.25 GHz can be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW).

TABLE 1

| Frequency Range designation | Corresponding frequency range | Subcarrier Spacing |
| --- | --- | --- |
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
| --- | --- | --- |
| FR1 | 410 MHz-7125 MHz | 15, 30, 60 kHz |
| FR2 | 24250 MHz-52600 MHz | 60, 120, 240 kHz |

Here, the radio communication technologies implemented in the wireless devices in the present disclosure may include narrowband internet-of-things (NB-IoT) technology for low-power communication as well as LTE, NR and 6G. For example, NB-IoT technology may be an example of low power wide area network (LPWAN) technology, may be implemented in specifications such as LTE Cat NB1 and/or LTE Cat NB2, and may not be limited to the above-mentioned names. Additionally and/or alternatively, the radio communication technologies implemented in the wireless devices in the present disclosure may communicate based on LTE-M technology. For example, LTE-M technology may be an example of LPWAN technology and be called by various names such as enhanced machine type communication (eMTC). For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M, and may not be limited to the above-mentioned names. Additionally and/or alternatively, the radio communication technologies implemented in the wireless devices in the present disclosure may include at least one of ZigBee, Bluetooth, and/or LPWAN which take into account low-power communication, and may not be limited to the above-mentioned names. For example, ZigBee technology may generate personal area networks (PANs) associated with small/low-power digital communication based on various specifications such as IEEE 802.15.4 and may be called various names.

Figure 2:
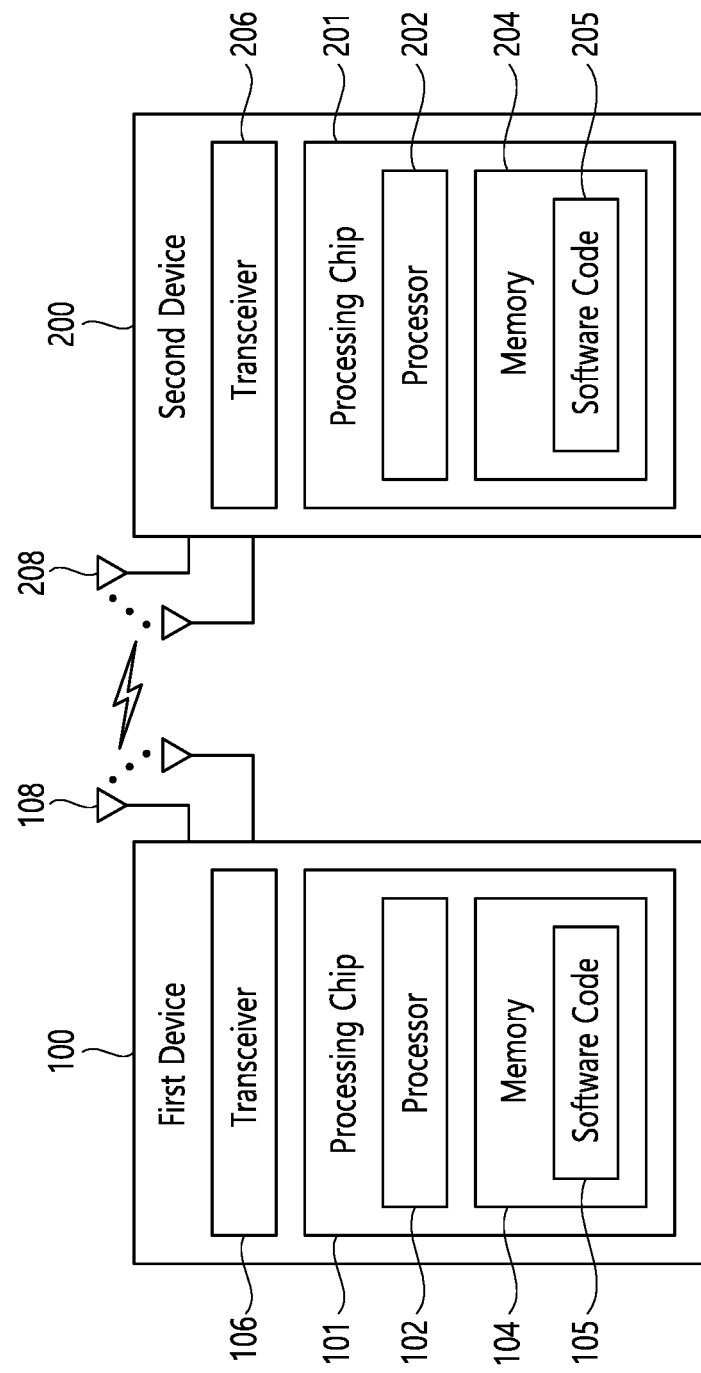
FIG. 2 shows an example of wireless devices to which implementations of the present disclosure is applied.

FIG. 2 shows an example of wireless devices to which implementations of the present disclosure is applied.

Referring to FIG. 2, a first wireless device 100 and a second wireless device 200 may transmit/receive radio signals to/from an external device through a variety of RATs (e.g., LTE and NR).

In FIG. 2, {the first wireless device 100 and the second wireless device 200} may correspond to at least one of {the wireless device 100a to 100f and the BS 200}, {the wireless device 100a to 100f and the wireless device 100a to 100f} and/or {the BS 200 and the BS 200} of FIG. 1.

The first wireless device 100 may include at least one transceiver, such as a transceiver 106, at least one processing chip, such as a processing chip 101, and/or one or more antennas 108.

The processing chip 101 may include at least one processor, such a processor 102, and at least one memory, such as a memory 104. It is exemplarily shown in FIG. 2 that the memory 104 is included in the processing chip 101. Additional and/or alternatively, the memory 104 may be placed outside of the processing chip 101.

The processor 102 may control the memory 104 and/or the transceiver 106 and may be configured to implement the descriptions, functions, procedures, suggestions, methods and/or operational flowcharts described in the present disclosure. For example, the processor 102 may process information within the memory 104 to generate first information/signals and then transmit radio signals including the first information/signals through the transceiver 106. The processor 102 may receive radio signals including second information/signals through the transceiver 106 and then store information obtained by processing the second information/signals in the memory 104.

The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 to perform one or more layers of the radio interface protocol.

Herein, the processor 102 and the memory 104 may be a part of a communication modem/circuit/chip designed to implement RAT (e.g., LTE or NR). The transceiver 106 may be connected to the processor 102 and transmit and/or receive radio signals through one or more antennas 108. Each of the transceiver 106 may include a transmitter and/or a receiver. The transceiver 106 may be interchangeably used with radio frequency (RF) unit(s). In the present disclosure, the first wireless device 100 may represent a communication modem/circuit/chip.

The second wireless device 200 may include at least one transceiver, such as a transceiver 206, at least one processing chip, such as a processing chip 201, and/or one or more antennas 208.

The processing chip 201 may include at least one processor, such a processor 202, and at least one memory, such as a memory 204. It is exemplarily shown in FIG. 2 that the memory 204 is included in the processing chip 201. Additional and/or alternatively, the memory 204 may be placed outside of the processing chip 201.

The processor 202 may control the memory 204 and/or the transceiver 206 and may be configured to implement the descriptions, functions, procedures, suggestions, methods and/or operational flowcharts described in the present disclosure. For example, the processor 202 may process information within the memory 204 to generate third information/signals and then transmit radio signals including the third information/signals through the transceiver 206. The processor 202 may receive radio signals including fourth information/signals through the transceiver 106 and then store information obtained by processing the fourth information/signals in the memory 204.

The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure. For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 to perform one or more layers of the radio interface protocol.

Herein, the processor 202 and the memory 204 may be a part of a communication modem/circuit/chip designed to implement RAT (e.g., LTE or NR). The transceiver 206 may be connected to the processor 202 and transmit and/or receive radio signals through one or more antennas 208. Each of the transceiver 206 may include a transmitter and/or a receiver. The transceiver 206 may be interchangeably used with RF unit. In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, media access control (MAC) layer, radio link control (RLC) layer, packet data convergence protocol (PDCP) layer, radio resource control (RRC) layer, and service data adaptation protocol (SDAP) layer). The one or more processors 102 and 202 may generate one or more protocol data units (PDUs) and/or one or more service data unit (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, suggestions, methods and/or operational flowcharts disclosed in the present disclosure may be implemented using firmware or software and the firmware or software may be configured to include the modules, procedures, or functions. Firmware or software configured to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas 108 and 208 may be a plurality of physical antennas or a plurality of logical antennas (e.g., antenna ports).

The one or more transceivers 106 and 206 may convert received user data, control information, radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the one or more transceivers 106 and 206 can up-convert OFDM baseband signals to OFDM signals by their (analog) oscillators and/or filters under the control of the one or more processors 102 and 202 and transmit the up-converted OFDM signals at the carrier frequency. The one or more transceivers 106 and 206 may receive OFDM signals at a carrier frequency and down-convert the OFDM signals into OFDM baseband signals by their (analog) oscillators and/or filters under the control of the one or more processors 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be configured to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be configured to perform the BS behavior according to an implementation of the present disclosure or control the transceiver(s) 206 to perform the BS behavior according to an implementation of the present disclosure.

In the present disclosure, a BS is also referred to as a node B (NB), an eNode B (eNB), or a gNB.

Figure 3:
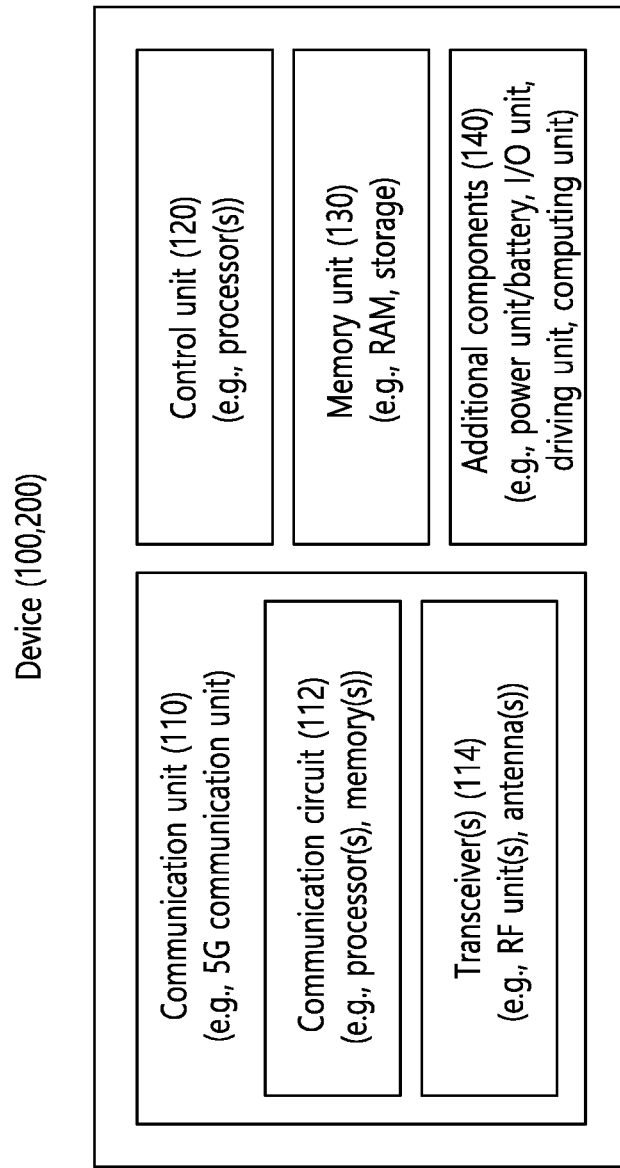
FIG. 3 shows an example of a wireless device to which implementations of the present disclosure is applied.

FIG. 3 shows an example of a wireless device to which implementations of the present disclosure is applied.

The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory unit 130, and the additional components 140 and controls overall operation of each of the wireless devices 100 and 200. For example, the control unit 120 may control an electric/mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, input/output (I/O) unit (e.g., audio I/O port, video I/O port), a driving unit, and a computing unit. The wireless devices 100 and 200 may be implemented in the form of, without being limited to, the robot (100a of FIG. 1), the vehicles (100b-1 and 100b-2 of FIG. 1), the XR device (100c of FIG. 1), the hand-held device (100d of FIG. 1), the home appliance (100e of FIG. 1), the IoT device (100f of FIG. 1), a digital broadcast terminal, a hologram device, a public safety device, an MTC device, a medicine device, a FinTech device (or a finance device), a security device, a climate/environment device, the AI server/device (400 of FIG. 1), the BSs (200 of FIG. 1), a network node, etc. The wireless devices 100 and 200 may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor (AP), an electronic control unit (ECU), a graphical processing unit, and a memory control processor. As another example, the memory unit 130 may be configured by a RAM, a DRAM, a ROM, a flash memory, a volatile memory, a non-volatile memory, and/or a combination thereof.

<Dual Connectivity (DC)>

Recently, a scheme for simultaneously connecting UE to different base stations, for example, a macro cell base station and a small cell base station, is being studied. This called dual connectivity (DC).

For example, when DC is configured in E-UTRA, the following exemplary description may be applied.

In DC, the eNodeB for the primary cell (PCell) may be referred to as a master eNodeB (hereinafter referred to as MeNB). In addition, the eNodeB only for the secondary cell (Scell) may be referred to as a secondary eNodeB (hereinafter referred to as SeNB).

A cell group including a primary cell (PCell) implemented by MeNB may be referred to as a master cell group (MCG) or PUCCH cell group 1. A cell group including a secondary cell (Scell) implemented by the SeNB may be referred to as a secondary cell group (SCG) or PUCCH cell group 2.

Meanwhile, among the secondary cells in the secondary cell group (SCG), a secondary cell in which the UE can transmit Uplink Control Information (UCI), or the secondary cell in which the UE can transmit a PUCCH may be referred to as a super secondary cell (Super SCell) or a primary secondary cell (Primary Scell; PScell).

Figure 4A:
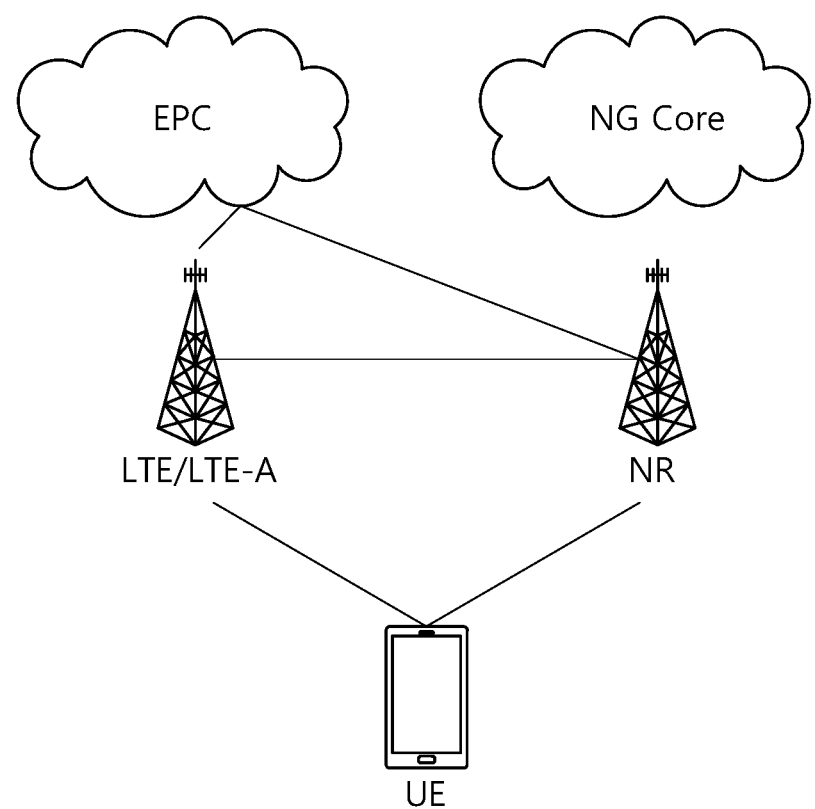
FIGS. 4*a* to 4*c* are diagrams illustrating exemplary architecture for a next-generation mobile communication service.
Figure 4B:
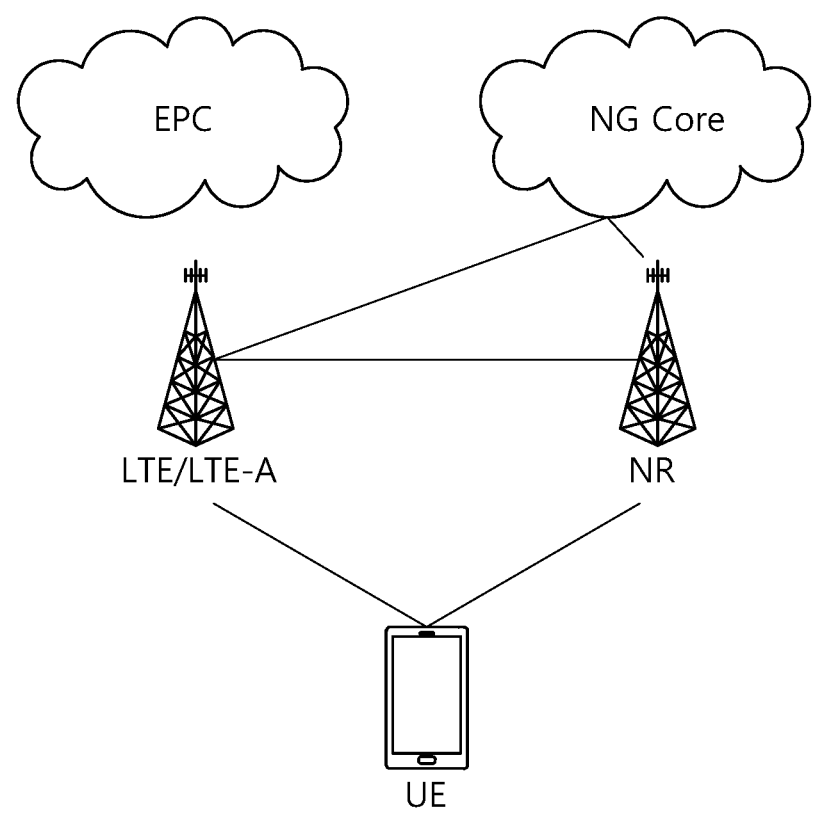
Figure 4C:
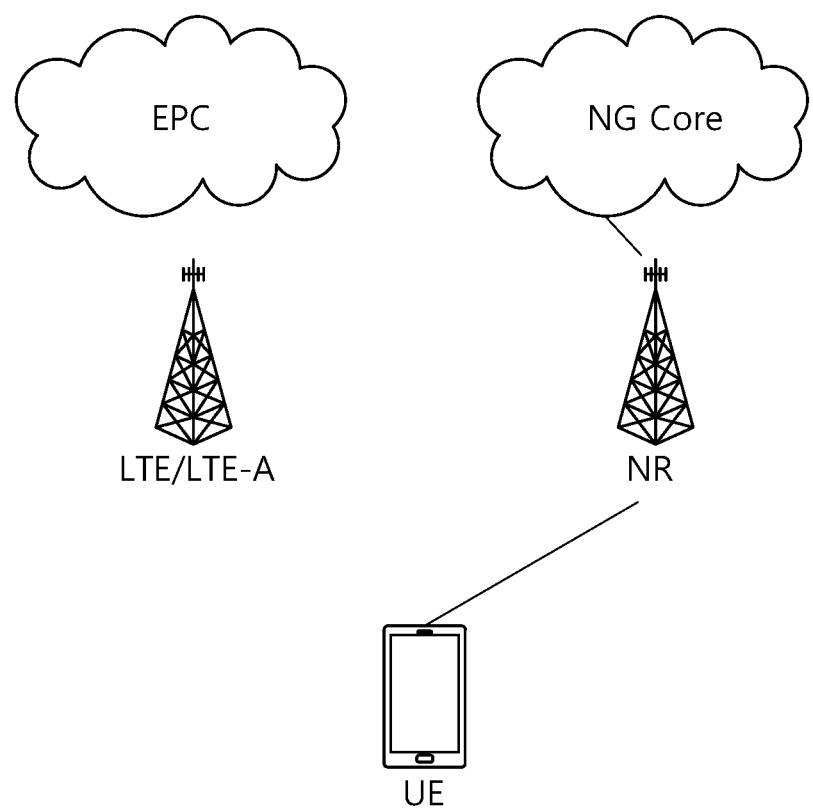

FIGS. 4a to 4c are diagrams illustrating exemplary architecture for a next-generation mobile communication service.

Referring to FIG. 4a, a UE is connected in dual connectivity (DC) with an LTE/LTE-A cell and a NR cell.

The NR cell is connected with a core network for the legacy fourth-generation mobile communication, that is, an Evolved Packet core (EPC). In example shown in FIG. 4a, the UE is configured with EN-DC (E-UTRA-NR DC). The UE, which is configured with EN-DC, is connected with an E-UTRA (that is, LTE/LTE-A) cell and an NR cell. Here, a PCell in EN-DC may be an E-UTRA (that is, LTE/LTE-A) cell, and a PSCell in EN-DC may be an NR cell.

Referring to FIG. 4b, the LTE/LTE-A cell is connected with a core network for 5th generation mobile communication, that is, a Next Generation (NG) core network, unlike the example in FIG. 4a.

A service based on the architecture shown in FIGS. 4a and 4b is referred to as a non-standalone (NSA) service.

Referring to FIG. 4c, a UE is connected only with an NR cell. A service based on this architecture is referred to as a standalone (SA) service.

Meanwhile, in the above new radio access technology (NR), using a downlink subframe for reception from a base station and using an uplink subframe for transmission to the base station may be considered. This method may be applied to paired spectrums and not-paired spectrums. A pair of spectrum indicates including two subcarrier for downlink and uplink operations. For example, one subcarrier in one pair of spectrum may include a pair of a downlink band and an uplink band.

Figure 5:
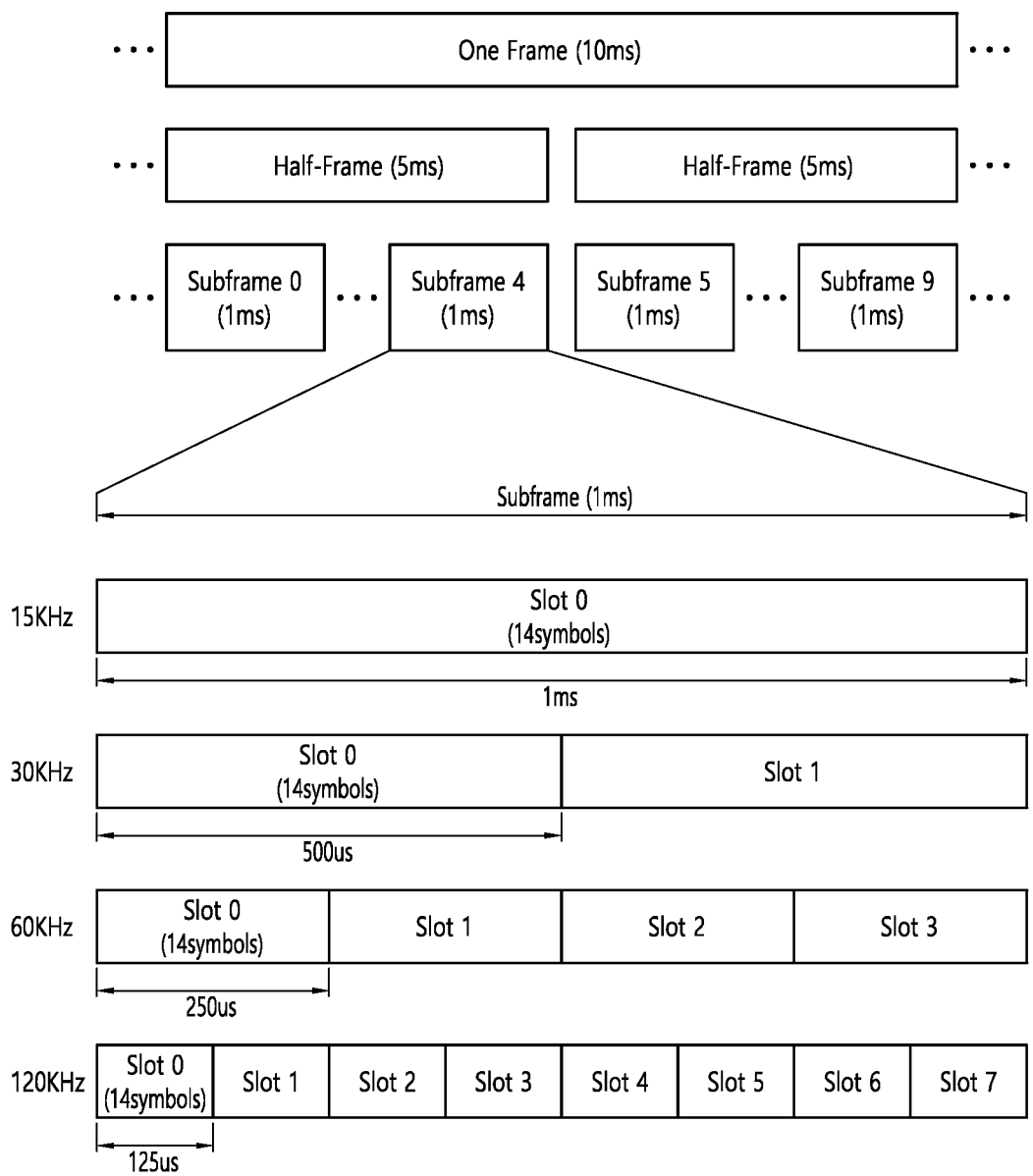
FIG. 5 shows a frame structure in a 3GPP based wireless communication system to which implementations of the present disclosure is applied.

FIG. 5 shows a frame structure in a 3GPP based wireless communication system to which implementations of the present disclosure is applied.

The frame structure shown in FIG. 5 is purely exemplary and the number of subframes, the number of slots, and/or the number of symbols in a frame may be variously changed. In the 3GPP based wireless communication system, OFDM numerologies (e.g., subcarrier spacing (SCS), transmission time interval (TTI) duration) may be differently configured between a plurality of cells aggregated for one UE. For example, if a UE is configured with different SCSs for cells aggregated for the cell, an (absolute time) duration of a time resource (e.g., a subframe, a slot, or a TTI) including the same number of symbols may be different among the aggregated cells. Herein, symbols may include OFDM symbols (or CP-OFDM symbols), SC-FDMA symbols (or discrete Fourier transform-spread-OFDM (DFT-s-OFDM) symbols).

Referring to FIG. 5, downlink and uplink transmissions are organized into frames. Each frame has $T_f=10$ ms duration. Each frame is divided into two half-frames, where each of the half-frames has 5 ms duration. Each half-frame consists of 5 subframes, where the duration $T_{sf}$ per subframe is 1 ms. Each subframe is divided into slots and the number of slots in a subframe depends on a subcarrier spacing. Each slot includes 14 or 12 OFDM symbols based on a cyclic prefix (CP). In a normal CP, each slot includes 14 OFDM symbols and, in an extended CP, each slot includes 12 OFDM symbols. The numerology is based on exponentially scalable subcarrier spacing $\Delta f=2^u*15$ kHz.

Table 3 shows the number of OFDM symbols per slot $N^{slot}_{symb}$, the number of slots per frame $N^{frame,u}_{slot}$, and the number of slots per subframe $N^{subframe,u}_{slot}$ for the normal CP, according to the subcarrier spacing $\Delta f=2^u*15$ kHz.

TABLE 3

| u | $N^{slot}_{symb}$ | $N^{frame,u}_{slot}$ | $N^{subframe,u}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Table 4 shows the number of OFDM symbols per slot $N^{slot}_{symb}$, the number of slots per frame $N^{frame,u}_{slot}$, and the number of slots per subframe $N^{subframe,u}_{slot}$ for the extended CP, according to the subcarrier spacing $\Delta f=2^u*15$ kHz.

TABLE 4

| u | $N^{slot}_{symb}$ | $N^{frame,u}_{slot}$ | $N^{subframe,u}_{slot}$ |
|---|---|---|---|
| 2 | 12 | 40 | 4 |

<Operating Band in NR>

An operating band shown in Table 5 is a reframing operating band that is transitioned from an operating band of LTE/LTE-A. This operating band is referred to as FR1 band.

TABLE 5

| NR Operating Band | Uplink Operating Band $F_{UL\_low}$-$F_{UL\_high}$ | Downlink Operating Band $F_{DL\_low}$-$F_{DL\_high}$ | Duplex Mode |
|---|---|---|---|
| n1 | 1920 MHz-1980 MHz | 2110 MHz-2170 MHz | FDD |
| n2 | 1850 MHz-1910 MHz | 1930 MHz-1990 MHz | FDD |
| n3 | 1710 MHz-1785 MHz | 1805 MHz-1880 MHz | FDD |
| n5 | 824 MHz-849 MHz | 869 MHz-894 MHz | FDD |
| n7 | 2500 MHz-2570 MHz | 2620 MHz-2690 MHz | FDD |
| n8 | 880 MHz-915 MHz | 925 MHz-960 MHz | FDD |
| n12 | 699 MHz-716 MHz | 729 MHz-746 MHz | FDD |
| n13 | 777 MHz-787 MHz | 746 MHz-756 MHz | FDD |
| n14 | 788 MHz-798 MHz | 758 MHz-768 MHz | FDD |
| n18 | 815 MHz-830 MHz | 860 MHz-875 MHz | FDD |
| n20 | 832 MHz-862 MHz | 791 MHz-821 MHz | FDD |
| n24 | 1626.5 MHz-1660.5 MHz | 1525 MHz-1559 MHz | FDD |
| n25 | 1850 MHz-1915 MHz | 1930 MHz-1995 MHz | FDD |
| n26 | 814 MHz-849 MHz | 859 MHz-894 MHz | FDD |
| n28 | 703 MHz-748 MHz | 758 MHz-803 MHz | FDD |
| n29 | N/A | 717 MHz-728 MHz | SDL |
| n30 | 2305 MHz-2315 MHz | 2350 MHz-2360 MHz | FDD |
| n34 | 2010 MHz-2025 MHz | 2010 MHz-2025 MHz | TDD |
| n38 | 2570 MHz-2620 MHz | 2570 MHz-2620 MHz | TDD |
| n39 | 1880 MHz-1920 MHz | 1880 MHz-1920 MHz | TDD |
| n40 | 2300 MHz-2400 MHz | 2300 MHz-2400 MHz | TDD |
| n41 | 2496 MHz-2690 MHz | 2496 MHz-2690 MHz | TDD |
| n46 | 5150 MHz-5925 MHz | 5150 MHz-5925 MHz | TDD |
| n47 | 5855 MHz-5925 MHz | 5855 MHz-5925 MHz | TDD |
| n48 | 3550 MHz-3700 MHz | 3550 MHz-3700 MHz | TDD |
| n50 | 1432 MHz-1517 MHz | 1432 MHz-1517 MHz | TDD1 |
| n51 | 1427 MHz-1432 MHz | 1427 MHz-1432 MHz | TDD |
| n53 | 2483.5 MHz-2495 MHz | 2483.5 MHz-2495 MHz | TDD |
| n65 | 1920 MHz-2010 MHz | 2110 MHz-2200 MHz | FDD |
| n66 | 1710 MHz-1780 MHz | 2110 MHz-2200 MHz | FDD |
| n70 | 1695 MHz-1710 MHz | 1995 MHz-2020 MHz | FDD |
| n71 | 663 MHz-698 MHz | 617 MHz-652 MHz | FDD |
| n74 | 1427 MHz-1470 MHz | 1475 MHz-1518 MHz | FDD |
| n75 | N/A | 1432 MHz-1517 MHz | SDL |
| n76 | N/A | 1427 MHz-1432 MHz | SDL |
| n77 | 3300 MHz-4200 MHz | 3300 MHz-4200 MHz | TDD |
| n78 | 3300 MHz-3800 MHz | 3300 MHz-3800 MHz | TDD |
| n79 | 4400 MHz-5000 MHz | 4400 MHz-5000 MHz | TDD |
| n80 | 1710 MHz-1785 MHz | N/A | SUL |
| n81 | 880 MHz-915 MHz | N/A | SUL |
| n82 | 832 MHz-862 MHz | N/A | SUL |
| n83 | 703 MHz-748 MHz | N/A | SUL |
| n84 | 1920 MHz-1980 MHz | N/A | SUL |
| n85 | 698 MHz-716 MHz | 728 MHz-746 MHz | FDD |
| n86 | 1710 MHz-1780 MHz | N/A | SUL |
| n89 | 824 MHz-849 MHz | N/A | SUL |
| n90 | 2496 MHz-2690 MHz | 2496 MHz-2690 MHz | TDD |
| n91 | 832 MHz-862 MHz | 1427 MHz-1432 MHz | FDD |
| n92 | 832 MHz-862 MHz | 1432 MHz-1517 MHz | FDD |
| n93 | 880 MHz-915 MHz | 1427 MHz-1432 MHz | FDD |
| n94 | 880 MHz-915 MHz | 1432 MHz-1517 MHz | FDD |
| n95 | 2010 MHz-2025 MHz | N/A | SUL |
| n96 | 5925 MHz-7125 MHz | 5925 MHz-7125 MHz | TDD |
| n97 | 2300 MHz-2400 MHz | N/A | SUL |
| n98 | 1880 MHz-1920 MHz | N/A | SUL |
| n99 | 1626.5 MHz-1660.5 MHz | N/A | SUL |

The following table shows an NR operating band defined at high frequencies. This operating band is referred to as FR2 band.

TABLE 6

| NR Operating Band | Uplink Operating Band $F_{UL\_low}$-$F_{UL\_high}$ | Downlink Operating Band $F_{DL\_low}$-$F_{DL\_high}$ | Duplex Mode |
|---|---|---|---|
| n257 | 26500 MHz-29500 MHz | 26500 MHz-29500 MHz | TDD |
| n258 | 24250 MHz-27500 MHz | 24250 MHz-27500 MHz | TDD |
| n259 | 39500 MHz-43500 MHz | 39500 MHz-43500 MHz | TDD |
| n260 | 37000 MHz-40000 MHz | 37000 MHz-40000 MHz | TDD |
| n261 | 27500 MHz-28350 MHz | 27500 MHz-28350 MHz | TDD |
| n262 | 47200 MHz-48200 MHz | 47200 MHz-48200 MHz | TDD |

Meanwhile, when the operating band shown in the above table is used, a channel bandwidth is used as shown in the following table. For example, Table 7 shows an example of a maximum value of the cannel bandwidth.

TABLE 7

| SCS (kHz) | 5 MHz $N_{RB}$ | 10 MHz $N_{RB}$ | 15 MHz $N_{RB}$ | 20 MHz $N_{RB}$ | 25 MHz $N_{RB}$ | 30 MHz $N_{RB}$ | 40 MHz $N_{RB}$ | 50 MHz $N_{RB}$ | 60 MHz $N_{RB}$ | 70 MHz $N_{RB}$ | 80 MHz $N_{RB}$ | 90 MHz $N_{RB}$ | 100 MHz $N_{RB}$ |
|---|---|---|---|---|---|---|---|---|---|---|---|---|---|
| 15 | 25 | 52 | 79 | 106 | 133 | 160 | 216 | 270 | N/A | N/A | N/A | N/A | N/A |
| 30 | 11 | 24 | 38 | 51 | 65 | 78 | 106 | 133 | 162 | 189 | 217 | 245 | 273 |
| 60 | N/A | 11 | 18 | 24 | 31 | 38 | 51 | 65 | 79 | 93 | 107 | 121 | 135 |

In the above table, SCS indicates a subcarrier spacing. In the above table, NRB indicates the number of RBs.

Meanwhile, when the operating band shown in the above Table 6 is used, a channel bandwidth is used as shown in the following table 8.

TABLE 8

| SCS (kHz) | 50 MHz $N_{RB}$ | 100 MHz $N_{RB}$ | 200 MHz $N_{RB}$ | 400 MHz $N_{RB}$ |
|---|---|---|---|---|
| 60 | 66 | 132 | 264 | N/A |
| 120 | 32 | 66 | 132 | 264 |

In NR, E-UTRA (Evolved Universal Terrestrial Radio Access) operating bands may also be used for communication. E-UTRA operating bands may mean operating bands of LTE.

The following table is an example of E-UTRA operating bands.

TABLE 9

| E-UTRA Operating Band | Uplink (UE) operating band BS receive UE transmit $F_{UL\_low}$-$F_{UL\_high}$ | Downlink (DE) operating band BS transmit UE receive $F_{DL\_low}$-$F_{DL\_high}$ | Duplex Mode |
|---|---|---|---|
| 1 | 1920 MHz-1980 MHz | 2110 MHz-2170 MHz | FDD |
| 2 | 1850 MHz-1910 MHz | 1930 MHz-1990 MHz | FDD |
| 3 | 1710 MHz-1785 MHz | 1805 MHz-1880 MHz | FDD |
| 4 | 1710 MHz-1755 MHz | 2110 MHz-2155 MHz | FDD |
| 5 | 824 MHz-849 MHz | 869 MHz-894MHz | FDD |
| 6 | 830 MHz-840 MHz | 875 MHz-885 MHz | FDD |
| 7 | 2500 MHz-2570 MHz | 2620 MHz-2690 MHz | FDD |
| 8 | 880 MHz-915 MHz | 925 MHz-960 MHz | FDD |
| 9 | 1749.9 MHz-1784.9 MHz | 1844.9 MHz-1879.9 MHz | FDD |
| 10 | 1710 MHz-1770 MHz | 2110 MHz-2170 MHz | FDD |
| 11 | 1427.9 MHz-1447.9 MHz | 1475.9 MHz-1495.9 MHz | FDD |
| 12 | 699 MHz-716 MHz | 729 MHz-746 MHz | FDD |
| 13 | 777 MHz-787 MHz | 746 MHz-756 MHz | FDD |

TABLE 9-continued

| E-UTRA Operating Band | Uplink (UE) operating band BS receive UE transmit $F_{UL\_low}$-$F_{UL\_high}$ | Downlink (DE) operating band BS transmit UE receive $F_{DL\_low}$-$F_{DL\_high}$ | Duplex Mode |
|---|---|---|---|
| 14 | 788 MHz-798 MHz | 758 MHz-768 MHz | FDD |
| 15 | Reserved | Reserved | FDD |
| 16 | Reserved | Reserved | FDD |
| 17 | 704 MHz-716 MHz | 734 MHz-746 MHz | FDD |
| 18 | 815 MHz-830 MHz | 860 MHz-875 MHz | FDD |
| 19 | 830 MHz-845 MHz | 875 MHz-890 MHz | FDD |
| 20 | 832 MHz-862 MHz | 791 MHz-821 MHz | FDD |
| 21 | 1447.9 MHz-1462.9 MHz | 1495.9 MHz-1510.9 MHz | FDD |
| 22 | 3410 MHz-3490 MHz | 3510 MHz-3590 MHz | FDD |
| 23 | 2000 MHz-2020 MHz | 2180 MHz-2200 MHz | FDD |
| 24 | 1626.5 MHz-1660.5 MHz | 1525 MHz-1559 MHz | FDD |
| 25 | 1850 MHz-1915 MHz | 1930 MHz-1995 MHz | FDD |
| 26 | 814 MHz-849 MHz | 859 MHz-894 MHz | FDD |
| 27 | 807 MHz-824 MHz | 852 MHz-869 MHz | FDD |
| 28 | 703 MHz-748 MHz | 758 MHz-803 MHz | FDD |
| 29 | N/A | 717 MHz-728 MHz | FDD |
| 30 | 2305 MHz-2315 MHz | 2350 MHz-2360 MHz | FDD |
| 31 | 452.5 MHz-457.5 MHz | 462.5 MHz-467.5 MHz | FDD |
| 32 | N/A | 1452 MHz-1496 MHz | FDD |
| 33 | 1900 MHz-1920 MHz | 1900 MHz-1920 MHz | TDD |
| 34 | 2010 MHz-2025 MHz | 2010 MHz-2025 MHz | TDD |
| 35 | 1850 MHz-1910 MHz | 1850 MHz-1910 MHz | TDD |
| 36 | 1930 MHz-1990 MHz | 1930 MHz-1990 MHz | TDD |
| 37 | 1910 MHz-1930 MHz | 1910 MHz-1930 MHz | TDD |
| 38 | 2570 MHz-2620 MHz | 2570 MHz-2620 MHz | TDD |
| 39 | 1880 MHz-1920 MHz | 1880 MHz-1920 MHz | TDD |
| 40 | 2300 MHz-2400 MHz | 2300 MHz-2400 MHz | TDD |
| 41 | 2496 MHz-2690 MHz | 2496 MHz-2690 MHz | TDD |
| 42 | 3400 MHz-3600 MHz | 3400 MHz-3600 MHz | TDD |
| 43 | 3600 MHz-3800 MHz | 3600 MHz-3800 MHz | TDD |
| 44 | 703 MHz-803 MHz | 703 MHz-803 MHz | TDD |
| 45 | 1447 MHz-1467 MHz | 1447 MHz-1467 MHz | TDD |
| 46 | 5150 MHz-5925 MHz | 5150 MHz-5925 MHz | TDD |
| 46 | 5150 MHz-5925 MHz | 5150 MHz-5925 MHz | TDD |
| 47 | 5855 MHz-5925 MHz | 5855 MHz-5925 MHz | TDD |
| 48 | 3550 MHz-3700 MHz | 3550 MHz-3700 MHz | TDD |
| 49 | 3550 MHz-3700 MHz | 3550 MHz-3700 MHz | TDD |
| 50 | 1432 MHz-1517 MHz | 1432 MHz-1517 MHz | TDD |
| 51 | 1427 MHz-1432 MHz | 1427 MHz-1432 MHz | TDD |
| 64 | Reserved | | |
| 65 | 1920 MHz-2010 MHz | 2110 MHz-2200 MHz | FDD |
| 66 | 1710 MHz-1780 MHz | 2110 MHz-2200 MHz | FDD |
| 67 | N/A | 738 MHz-758 MHz | FDD |
| 68 | 698 MHz-728 MHz | 753 MHz-783 MHz | FDD |
| 69 | N/A | 2570 MHz-2620 MHz | FDD |
| 70 | 1695 MHz-1710 MHz | 1995 MHz-2020 MHz | FDD |
| 71 | 663 MHz-698 MHz | 617 MHz-652 MHz | FDD |
| 72 | 451 MHz-456 MHz | 461 MHz-466 MHz | FDD |
| 73 | 450 MHz-455 MHz | 460 MHz-465 MHz | FDD |
| 74 | 1427 MHz-1470 MHz | 1475 MHz-1518 MHz | FDD |
| 75 | N/A | 1432 MHz-1517 MHz | FDD |
| 76 | N/A | 1427 MHz-1432 MHz | FDD |
| 85 | 698 MHz-716 MHz | 728 MHz-746 MHz | FDD |

<Disclosure of the Present Specification>

Herein, the power class of UE may mean the maximum allowed output power of the all types of device including handheld device UE in FR1 frequency range. Specially, in FR2, the multiple power class according to device type are defined, such as handheld UE (Power class 3), FWA UE (power class 1) and vehicular UE (power class2) as follow.

Table 10 shows an example of UE power class based on device types in FR2.

TABLE 10

| UE Power class | UE type |
| --- | --- |
| 1 | Fixed wireless access (FWA) UE |
| 2 | Vehicular UE |
| 3 | Handheld UE |
| 4 | High power non-handheld UE |
| 5 | Fixed wireless access (FWA) UE |

However, in FR1 range, the power class shall be distinguished by the maximum allowed power levels in all device type. Then, the power class 2 UE can support maximum output power up to 26 dBm. The power class 3 UE can support maximum output power up to 23 dBm as follow.

Table 11 shows an example of UE power class in FR1 ally, in FDD band, due to the characteristics of the FDD band, Tx/Rx is being simultaneously full duplexed through a specific frequency separation.

However, when power boosting of 3 dB or more is allowed, linearity at high power in the duplexer is broken, and a leakage component due to high power in Tx affects the Rx band. Herein, "power boosting of 3 dB" occurs because maximum output power of the power class 2 is 3 dB bigger than maximum output power of conventional power class 3. So, in order to maintain the sensitivity standard of the existing terminal or in order to minimize the effect of standard relaxation, it is necessary to improve the characteristics of elements such as duplexer/PA and RFIC, and/or it is necessary to analyze the degree of reception sensitivity relaxation in the case where desensing occurs.

Therefore, the present disclosure researched and analyzed how much the Tx/Rx isolation of the device and the noise level at the receiving end to be suppressed to maintain the existing standard.

Also, in case of a terminal supporting n3 operating band of NR, when wide Channel Bandwidth (CBW) is used, the frequency separation distance between UL and DL is short. So that Counter Intermodulation Distortion (CIMD)5, generated by the transmission signal and DC, affects the receiv-

TABLE 11

| NR band | Class 1 (dBm) | Tolerance (dB) | Class 1.5 (dBm) | Tolerance (dB) | Class 2 (dBm) | Tolerance (dB) | Class 3 (dBm) | Tolerance (dB) |
| --- | --- | --- | --- | --- | --- | --- | --- | --- |
| n1 | | | | | | | 23 | ±31 |
| n2 | | | | | | | 23 | ±33 |
| n3 | | | | | | | 23 | ±33 |
| n5 | | | | | | | 23 | ±3 |
| n7 | | | | | | | 23 | ±33 |
| n8 | | | | | | | 23 | ±33 |
| n12 | | | | | | | 23 | ±33 |
| n13 | | | | | | | 23 | ±3 |
| n14 | 31 | +2/−3 | | | | | 23 | ±3 |
| n18 | | | | | | | 23 | ±38− |
| n20 | | | | | | | 23 | ±33 |
| n24 | | | | | | | 23 | +2/−3 |
| n25 | | | | | | | 23 | ±33 |
| n26 | | | | | | | 23 | ±33 |
| n28 | | | | | | | 23 | +2/−2.5 |
| n30 | | | | | | | 23 | ±3 |
| n34 | | | | | | | 23 | ±3 |
| n38 | | | | | | | 23 | ±3 |
| n39 | | | | | | | 23 | ±3 |
| n40 | | | | | 26 | +2/−3 | 23 | ±3 |
| n41 | | | 29 | +2/−3 | 26 | +2/−3 | 23 | ±33 |
| n47 | | | | | | | 23 | ±3 |
| n48 | | | | | | | 23 | +2/−3 |
| n50 | | | | | | | 23 | ±3 |
| n51 | | | | | | | 23 | ±3 |
| n53 | | | | | | | 23 | ±3 |
| n65 | | | | | | | 23 | ±3 |
| n66 | | | | | | | 23 | ±3 |
| n70 | | | | | | | 23 | ±3 |
| n71 | | | | | | | 23 | +2/−2.5 |
| n74 | | | | | | | 23 | ±34− |
| n77 | | | 29 | +2/−3 | 26 | +2/−3 | 23 | +2/−3 |
| n78 | | | 29 | +2/−3 | 26 | +2/−3 | 23 | +2/−3 |
| n79 | | | 29 | +2/−3 | 26 | +2/−3 | 23 | +2/−3 |
| . . . | | | | | | | | |

Conventionally, for power class 2 User Equipment (UE), the impact of self-interference on FDD band has not been analyzed.

For example, Standard specifications for high power terminals (e.g. power class 2 UE) in FDD band are being discussed. High power terminals are not allowed to perform communication based on the current FDD band. Additioning end of band n3. An analysis of sensitivity degradation was added to relax the reception sensitivity of PC2 terminal by CIMD5. However, effect of CIMD5 in operating band n3 was not discussed.

In the present disclosure, by studying the characteristics of the existing RF device, when the PC2 terminal is allowed in the FDD band, how much sensitivity degradation, compared to the PC3 terminal, is required to be allowed is analyzed.

The followings are examples of characteristics of duplexer for NR band n1 and NR band 3.

1) Duplexer Tx/Rx Isolation Level for NR Band 1

One manufacturer provides 51 dB of Duplexer Tx/Rx isolation level for frequency range of 2110 MHz to 2170 MHz, which is Rx band of NR band n1. Other manufacturer provides 55 dB of Duplexer Tx/Rx isolation level for frequency range of 2112.4 MHz to 2167.6 MHz, which is included in Rx band of NR band n1.

Average value of 51 dB and 55 dB, which is 53 dB, may be considered as Duplexer Tx/Rx isolation level for NR Band 1 of the present disclosure.

2) Duplexer Tx/Rx Isolation Level for NR Band 3

One manufacturer provides 48 dB of Duplexer Tx/Rx isolation level for frequency range of 1807.5 MHz to 1877.5 MHz, which is included in Rx band of NR band n3. Other manufacturer provides 50 dB of Duplexer Tx/Rx isolation level for frequency range of 1805 MHz to 1880 MHz, which is Rx band of NR band n3.

Average value of 48 dB and 50 dB, which is 49 dB, may be considered as Duplexer Tx/Rx isolation level for NR Band n3 of the present disclosure.

On the other hand, interference issues for high power UE (e.g. power class 2 UE) for one NR FDD band has been studied as follows.

Receiver sensitivity degradation due to high max, out power and Tx/Rx isolation levels according to RF component performance in both n1 and n3 FDD bands can be studied. Analyses on receiver sensitivity degradation can be encouraged. Herein, high max means that PC2 UE using FDD band has maximum output power of 26 dBm, which is 3 dB bigger than conventional PC3 UE using FDD band.

Various examples of the present disclosure may propose the initial results for Receiver sensitivity degradation considering with current status of RF component performance for FDD band of band n1 and n3, for NR UE.

According to some embodiment of the present disclosure, the PC2 UE may efficiently and/or precisely perform communication based on FDD operating bands. For example, the impact of self interference on FDD band for PC 2 UE is analyzed. Also, the degree of reception sensitivity relaxation in the case where desensing occurs is analyzed. Also, effect CIMD problem occurs in FDD band is analyzed. Also, MSD values applied to reference sensitivity for receiving the downlink signal are clearly determined.

The following drawings are prepared to explain a specific example of the present specification. Since the names of specific devices or names of specific signals/messages/fields described in the drawings are provided by way of example, technical features of the present specification are not limited to specific names used in the following drawings.

Figure 6:
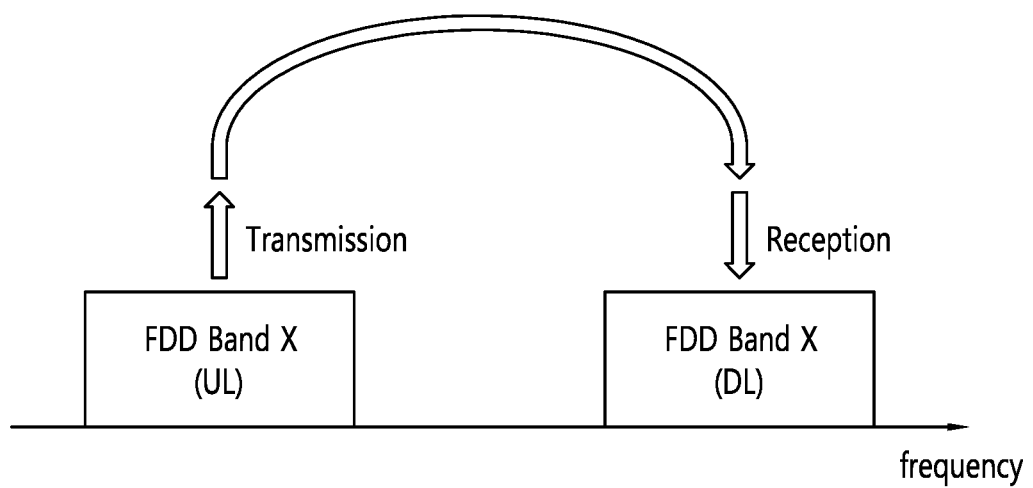
FIG. 6 illustrates an example of situation in which an uplink signal transmitted via an uplink operating band affects reception of a downlink signal on via downlink operating band.

FIG. 6 illustrates an example of situation in which an uplink signal transmitted via an uplink operating band affects reception of a downlink signal on via downlink operating band.

In FIG. 6, the UE is configured to perform communication based on NR FDD band X. Transmission based on Uplink (UL) band of FDD band X may cause impact to Reception based on Downlink (DL) band of FDD band X.

In a case that the UE is power class 2 UE, power boosting of 3 dB may cause non-linearity in the RF component (e.g. duplexer) of the UE. Thus, leakage component from transmission affects reception.

The UE should be configured to satisfy a reference sensitivity power level (REFSENS) which is the minimum average power for each antenna port of the UE when receiving the downlink signal.

When the impact occur as shown in the example of FIG. 6, there is a possibility that the REFSENS for the downlink signal may not be satisfied due to the uplink signal transmitted by the UE itself.

For example, the REFSENS may be set such that the downlink signal throughput of the UE is 95% or more of the maximum throughput of the reference measurement channel. When the impact occurs, there is a possibility that the downlink signal throughput is reduced to 95% or less of the maximum throughput.

Therefore, the impact on Rx band is analyzed in the present disclosure, and the maximum sensitivity degradation (MSD) value may be defined for the corresponding frequency band, so relaxation for REFSENS in the reception band related to its own transmission signal may be allowed. Here, the MSD may mean the maximum allowed reduction of the REFSENS. When the MSD is defined for a specific operating band of the UE, the REFSENS of the corresponding operating band may be relaxed by the amount of the defined MSD.

Hereinafter, in examples of the disclosure of the present specification, self defense and/or self-interference due to uplink transmission in FDD band are analyzed, and a relaxed standard for sensitivity thereto is proposed. For example, the relaxed standard for sensitivity may be based on MSD.

Figure 7:
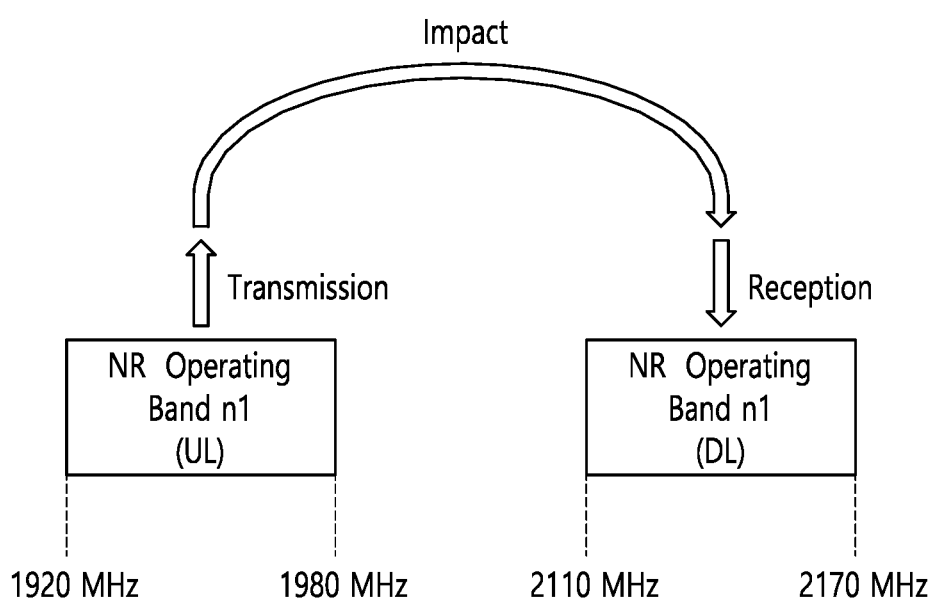
FIG. 7 illustrates an example of situation in which an uplink signal transmitted affects reception of a downlink signal for NR operating band n1.
Figure 8:
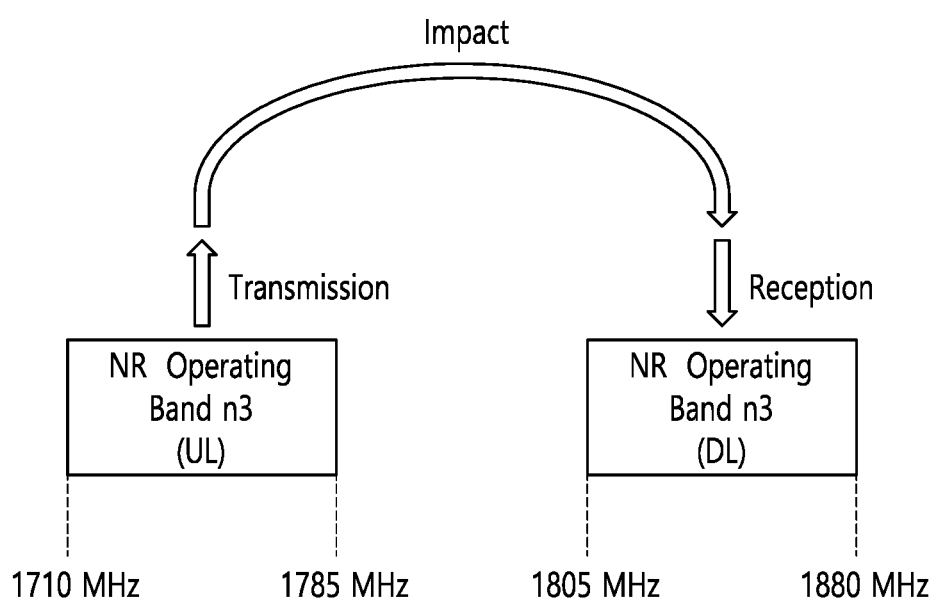
FIG. 8 illustrates an example of situation in which an uplink signal transmitted affects reception of a downlink signal for NR operating band n3.

In various examples of the present disclosure, self defense and/or self-interference due to uplink transmission in FDD band, such as NR operating band n1 and/or n3, are analyzed. FIG. 7 shows an example related to NR operating band n1 and FIG. 8 shows an example related to NR operating band n3.

The following drawings are prepared to explain a specific example of the present specification. Since the names of specific devices or names of specific signals/messages/fields described in the drawings are provided by way of example, technical features of the present specification are not limited to specific names used in the following drawings.

FIG. 7 illustrates an example of situation in which an uplink signal transmitted affects reception of a downlink signal for NR operating band n1.

In FIG. 7, the UE is configured to perform communication based on NR FDD band n1. Transmission based on Uplink (UL) band of FDD band n1 may cause impact to Reception based on Downlink (DL) band of FDD band n1.

In a case that the UE is power class 2 UE, power boosting of 3 dB may cause non-linearity in the RF component (e.g. duplexer) of the UE. Thus, leakage component from transmission affects reception.

The following drawings are prepared to explain a specific example of the present specification. Since the names of specific devices or names of specific signals/messages/fields described in the drawings are provided by way of example, technical features of the present specification are not limited to specific names used in the following drawings.

FIG. 8 illustrates an example of situation in which an uplink signal transmitted affects reception of a downlink signal for NR operating band n3.

In FIG. 8, the UE is configured to perform communication based on NR FDD band n1. Transmission based on Uplink (UL) band of FDD band n3 may cause impact to Reception based on Downlink (DL) band of FDD band n3.

In a case that the UE is power class 2 UE, power boosting of 3 dB may cause non-linearity in the RF component (e.g. duplexer) of the UE. Thus, leakage component from transmission affects reception.

Figure 9:
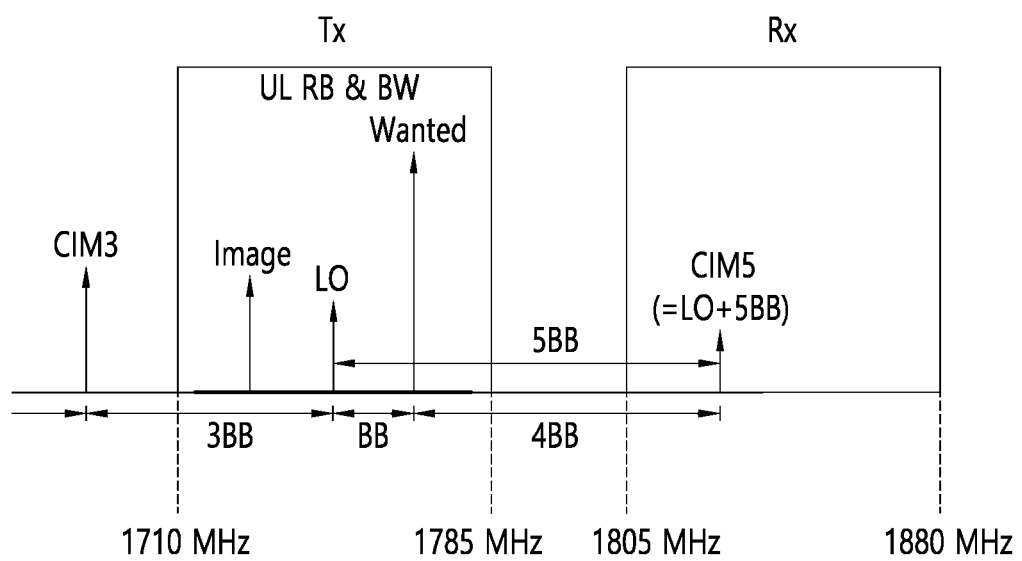
FIG. 9 illustrates an example of an impact of CIMD5 problem in NR band n3.

For reference, CIM5 shown in example of FIG. 9 may be further considered for NR operating band n3.

In the first example of the disclosure of the present specification, receiver sensitivity for PC2 UE in FDD band (e.g. bands n1 and/or n3) are analyzed in detail.

1. First Example of the Disclosure of the Present Specification

First Example of the Disclosure of the Present Specification provides Analysis on the receiver sensitivity by PC2 UE in FDD band.

The RF component performance in FDD band such as n1/n3 is analyzed.

To derive sensitivity degradation in band n1 and/or n3, the current RFIC characteristics and Duplexer & PA characteristics in each NR band may be assumed to be used.

Table 12 shows an example of the current RF component characteristics according to each NR band.

TABLE 12

| parameters | NR n1 band | NR n3 band |
|---|---|---|
| Total NF (dB) | 9.00 | 9.00 |
| RFIC Noise for Rx band (dBm/Hz) | −153 | −150 |
| PA Noise for Rx band (dBm/Hz) | −125 | −122 |
| PA Gain for Rx band (dB) | 28 | 28 |
| Duplexer Tx/Rx isolation (dB) | 53 | 49 |
| RF Front-End Loss (dB) | 4 | 4 |
| Diversity gain (dB) | 3 | 3 |
| Antenna isolation (dB) | 10 | 10 |

Table 12 shows an example of RF parameters according to each NR band. NF may mean noise figure. PA means Power amplifier. RFIC may mean Radio Frequency Integrated Circuits.

For PC2 REFSENS requirements in each FDD bands, the receiver sensitivity may be impacted by duplexer isolation levels and increasing noise level by RFIC and PA for Rx band at antenna connector based on PC3 REFSENS requirements in each FDD bands.

Hence, the present disclosure derived the receiver sensitivity degradation based on the increasing noise level in Rx band by duplexer isolation and RFIC/PA noise for PC2 transmission in FDD band.

The following Table 13 shows an example of REFSENS for PC3 UE in FDD NR bands n1 and n3 as reference point.

C/N(Carrier to Noise) requirement may mean target Signal to Noise Ratio (SNR). MRC may mean maximum-ratio combining.

C/N(Carrier to Noise) may indicate the intensity of noise level compared to a signal (e.g. carrier) to be received. C/N requirement of −1 dB means a capability of receiving signal (e.g. carrier), when the received signal (e.g. carrier) is −1 dB smaller than noise level.

RFFE (RF Front End) may mean uppermost block of RF Radio. RFFE may mean RF components between RFIC and Antenna. For example, RFFE may include PA, LNA, Duplexer etc.

IL (Insertion loss) may mean loss term of RF components. RFFE IL is RF Front End Insertion loss.

NF (Noise Figure) may mean how much noise is added as a signal passes through a certain system or a certain circuit block. NF can be used to calculate receiving sensitivity and MSD (maximum sensitivity Degradation).

RXBN(Rx band noise) may mean noise level induced by the Rx band.

Sensitivity with RXBN (PC3 max Tx power) may be calculated based on Total RXBN at Antenna connector, 10 MHz of CBW, and target SNR (C/N requirement).

For example, for NR n1 band and for Main path, Sensitivity with RXBN (PC3 max Tx power) is equal to summation of Total RXBN at Antenna connector (−163.1)+10 log(10 MHz) (that is, 10 log (10*10^6))+target SNR (C/N requirement, which is equal to −1.00). That is, Sensitivity with RXBN (PC3 max Tx power) is equal to −163.1+70−1=−94.1.

Values shown in final column of Table 13 are derived by using MRC for Sensitivity with RXBN (PC3 max Tx power) of Main path and Diversity path with margin (e.g. 1.2 dB for NR band n1, 1.6 dB for NR band n3).

1-1. Duplexer Tx/Rx Isolation

Dominant factor by Duplexer Tx/Rx isolation in each FDD band is analyzed.

The existing PA for FDD band needs to improve the linearity of maximum output power at least 3 dB higher than current PA characteristics. Also in duplexer aspect, filter vendor needs to enhance the Tx/Rx isolation level to guarantee the existing REFSENS or to relax defense impact in Rx band of FDD band. But it can also be a challenge to filter vendors for small Tx/Rx frequency gap exists in band such as Band 3 or NR band n3.

So, the present disclosure assumes degradation of 2 dB Tx/Rx isolation levels by 3 dB Transmission power increasing would be impacted the sensitivity degradation compare

TABLE 13

| | NR n1 band | | NR n3 band | |
|---|---|---|---|---|
| | Main path | Diversity path | Main path | Diversity path |
| C/N requirement (dB) | −1.00 | −1.00 | −1.00 | −1.00 |
| Noise floor at Antenna connector(dBm/Hz) | −165.0 | −165.0 | −165.0 | −165.0 |
| Total NF(RFFE IL + RF NF) (dB) | 9.00 | 9.00 | 9.00 | 9.00 |
| RFIC RX Band Noise level at Antenna connector (dBm/Hz) | −170.5 | −180.5 | −161.5 | −171.5 |
| PA RX Band Noise level at Antenna connector (dBm/Hz) | −170.5 | −180.5 | −161.5 | −171.5 |
| Total RXBN at Antenna connector (dBm/Hz) | −163.1 | −164.7 | −157.6 | −163.4 |
| Sensitivity with RXBN (PC3 max Tx power)(dBm) *10 MHz BW | −94.1 | −95.7 | −88.6 | −94.4 |
| After MRC | −98.0 (1.2 dB margin) | | −95.4 (1.6 dB margin) | | to PC3 duplexer in n3. That is, 2 dB Tx/Rx isolation levels are used for analyzing sensitivity degradation in the present disclosure, because impact of 3 dB increase in transmission power may be covered by 2 dB Tx/Rx isolation levels.

An example of Table 14, shows examples of expected sensitivity degradation levels by decreasing 2 dB isolation level in duplexer characteristics. As shown in Table 14, noise level is calculated by considering various parameters. Analysis result in Table 14 is derived based on an assumption that isolation level is decreased by 2 dB and considering parameters in Table 14. Thus, due to decrease of 2 dB isolation level, Noise level is increased by 2 dB for RFIC Rx band noise and PA Rx band noise. Analysis result of Table 14 shows determined MSD (e.g. 0.4 dB for n1 band, and 0.9 dB for n3 band), which is derived based on 2 dB decrease of isolation level of duplexer and based on various parameters shown in table 14. When isolation level is decreased by 2 dB, Noise level is increased by 2 dB for "RFIC RX Band Noise level at Antenna connector" and "PA RX Band Noise level at Antenna connector".

TABLE 14

|  | NR n1 band | | NR n3 band | |
| --- | --- | --- | --- | --- |
|  | Main path | Diversity path | Main path | Diversity path |
| C/N requirement (dB) | −1.00 | −1.00 | −1.00 | −1.00 |
| Noise floor at Antenna connector(dBm/Hz) | −165.0 | −165.0 | −165.0 | −165.0 |
| Total NF(RFFE IL + RF NF) (dB) | 9.00 | 9.00 | 9.00 | 9.00 |
| RFIC RX Band Noise level at Antenna connector (dBm/Hz) | −168.5 | −178.5 | −159.5 | −169.5 |
| PA RX Band Noise level at Antenna connector (dBm/Hz) | −168.5 | −178.5 | −159.5 | −169.5 |
| Total RXBN at Antenna connector (dBm/Hz) | −162.2 | −164.6 | −155.9 | −162.6 |
| Sensitivity with RXBN (PC3 max Tx power)(dBm) *10 MHz BW | −93.2 | −95.6 | −86.9 | −93.6 |
| After MRC | −97.6 dBm −> 0.4 dB MSD is needed | | −94.5 dBm −> 0.9 dB MSD is needed | |

An example of table 14 shows Sensitivity degradation by duplexer isolation 2 dB relaxation. Compared to table 13, duplexer isolation 2 dB is applied to RFIC RX Band Noise level at Antenna connector and PA RX Band Noise level at Antenna connector. Both RFIC RX Band Noise level at Antenna connector and PA RX Band Noise level at Antenna connector are increased by 2 dB compared to table 13. It is because when duplexer isolation characteristic is lowered by 2 dB, 2 dB of Noise level is increased in "RFIC RX Band Noise level at Antenna connector" and "PA RX Band Noise level at Antenna connector".

Table 14 may be interpreted in a same way with Table 13.

For NR band n1, comparing −97.6 dBm of table 14 and −98.0 dBm of table 13, 0.4 dB MSD is needed. For NR band n3, comparing −94.5 dBm of table 14 and −95.4 dBm of table 13, 0.9 dB MSD is needed.

Based on the example of Table 14, the following observations are derived:

Observation 1: In n3 FDD band, the 0.9 dB MSD is needed when Duplexer isolation characteristic is decreased 2 dB compare to current filter characteristics.

Observation 2: In n1 FDD band, the 0.4 dB MSD is needed when Duplexer isolation characteristic is decreased 2 dB compare to current filter characteristics.

1-2. RFIC/PA Noise Levels

Dominant factor by RFIC/PA noise levels in Rx band is analyzed.

The present disclosure considers the increased noise level in Rx band by RFIC/PA operation in FDD band. Even if filter vendor tries to keep or enhance the current Tx/Rx isolation level in duplexer for each FDD band, the raised leakage problem in Rx band also shall be considered.

Observation 3: Even though duplexer isolation level (e.g. 2 dB of section 1-1) keeps or enhance the Tx/Rx isolation level, the raised leakage problem in Rx band by RFIC/PA operation in FDD band may affect the sensitivity degradation in FDD band.

When 3 dB Tx power boosting is considered for PC2 UE, the noise level could be increased by RFIC/PA operation in Rx band. So, the present disclosure assumes noise level increasing about 1.5 dB in Rx band to derive the expected MSD level according to each FDD band.

TABLE 15

An example of Table 15, shows examples of expected sensitivity degradation levels by increasing noise level by RFIC/PA in Rx band.

|  | NR n1 band | | NR n3 band | |
| --- | --- | --- | --- | --- |
|  | Main path | Diversity path | Main path | Diversity path |
| C/N requirement (dB) | −1.00 | −1.00 | −1.00 | −1.00 |
| Noise floor at Antenna connector(dBm/Hz) | −165.0 | −165.0 | −165.0 | −165.0 |
| Total NF(RFFE IL + RF NF) (dB) | 9.00 | 9.00 | 9.00 | 9.00 |
| RFIC RX Band Noise level at Antenna connector (dBm/Hz) | −169.0 | −179.0 | −160.0 | −170.0 |
| PA RX Band Noise level at Antenna connector (dBm/Hz) | −169.0 | −179.0 | −160.0 | −170.0 |
| Total RXBN at Antenna connector (dBm/Hz) | −162.4 | −164.7 | −156.4 | −162.9 |
| Sensitivity with RXBN (PC3 max Tx power)(dBm) *10 MHzBW | −93.4 | −95.7 | −87.4 | −93.9 |
| After MRC | −97.7 dBm −> 0.3 dB MSD is needed | | −94.7 dBm −> 0.7 dB MSD is needed | |

An example of table 15 shows Sensitivity degradation by increasing noise level by RFIC/PA in Rx band. Compared to table 13, 1.5 dB increase in noise level is applied to RFIC RX Band Noise level at Antenna connector and PA RX Band Noise level at Antenna connector. Both RFIC RX Band Noise level at Antenna connector and PA RX Band Noise level at Antenna connector are increased by 1.5 dB compared to table 13.

Table 15 may be interpreted in a same way with Table 13.

For NR band n1, comparing −97.7 dBm of table 15 and −98.0 dBm of table 13, 0.3 dB MSD is needed. For NR band n3, comparing −94.7 dBm of table 15 and −95.4 dBm of table 13, 0.7 dB MSD is needed.

The expected MSD degradations of Table 15 are almost same as the expected MSD degradations of Table 14, which is based on Duplexer isolation degradation.

Based on the example of Table 15, the following observations are derived:

Observation 4: In n3 FDD band, the 0.7 dB MSD is needed when assuming noise level might be increased about 1.5 dB in Rx band by RFIC/PA operation.

Observation 5: In n1 FDD band, the 0.3 dB MSD is needed when assuming noise level might be increased about 1.5 dB in Rx band by RFIC/PA operation.

1-3. Duplexer Tx/Rx Isolation and RFIC/PA Noise Levels

Dominant factor by Duplexer Tx/Rx isolation and RFIC/PA noise levels in Rx band is analyzed.

The present disclosure considers worst case for MSD analysis. The worst case may mean that the duplexer isolation considering PC2 UE using FDD could not keep and enhanced characteristics of duplexer isolation of conventional PC3 UE using FDD such as in n3 FDD band due to small Tx/Rx frequency gap.

Then, above Duplexer performance may be decreased (e.g. section 1-1) and the noise level in Rx band may be increased in RFIC (e.g. section 1-2), due to 3 dB Tx power increasing for PC2 UE in FDD band. So, the above two factors (e.g. duplexer Tx/Rx isolation and RFIC/PA noise level) may affect the receiver sensitivity degradation in FDD band.

Example of Table 16 provides the expected sensitivity degradation by considering the duplexer characteristics (e.g. duplexer Tx/Rx isolation) and increased noise level in Rx band by RFIC/PA operation.

TABLE 16

|  | NR n1 band | | NR n3 band | |
| --- | --- | --- | --- | --- |
|  | Main path | Diversity path | Main path | Diversity path |
| C/N requirement (dB) | −1.00 | −1.00 | −1.00 | −1.00 |
| Noise floor at Antenna connector(dBm/Hz) | −165.0 | −165.0 | −165.0 | −165.0 |
| Total NF(RFFE IL + RF NF) (dB) | 9.00 | 9.00 | 9.00 | 9.00 |
| RFIC RX Band Noise level at Antenna connector (dBm/Hz) | −167.0 | −177.0 | −158.0 | −168.0 |
| PA RX Band Noise level at Antenna connector (dBm/Hz) | −167.0 | −177.0 | −158.0 | −168.0 |
| Total RXBN at Antenna connector (dBm/Hz) | −161.5 | −164.5 | −154.6 | −162.0 |
| Sensitivity with RXBN (PC3 max Tx power)(dBm) *10 MHz BW | −92.5 | −95.5 | −85.6 | −93.0 |
| After MRC | −97.2 dBm −> 0.8 dB MSD is needed | | −93.7 dBm −> 1.7 dB MSD is needed | |

An example of Table 16 shows examples of Sensitivity degradation by both duplexer isolation (2 dB relaxation) and increased noise level (1.5 dB) in Rx band by RFIC/PA operation.

Compared to table 13, 3.5 dB increase in noise level is applied to RFIC RX Band Noise level at Antenna connector and PA RX Band Noise level at Antenna connector. Both RFIC RX Band Noise level at Antenna connector and PA RX Band Noise level at Antenna connector are increased by 3.5 dB compared to table 13.

Table 16 may be interpreted in a same way with Table 13.

For NR band n1, comparing −97.2 dBm of table 16 and −98.0 dBm of table 13, 0.8 dB MSD is needed. For NR band n3, comparing −93.7 dBm of table 15 and −95.4 dBm of table 13, 1.7 dB MSD is needed.

Based on the example of Table 16, the following observations are derived:

Observation 6: In n3 FDD band, the 1.7 dB MSD is needed when both Duplexer isolation characteristic (2 dB relaxation) and increased noise level (1.5 dB) in Rx band by RFIC/PA operation for PC2 FDD UE.

Observation 7: In n1 FDD band, the 0.8 dB MSD is needed when both duplexer isolation characteristic (2 dB relaxation) and increased noise level (1.5 dB) in Rx band by RFFIC/PA operation for PC2 FDD UE.

For example, when the PC2 UE transmits uplink signal via NR operating band n1 and the PC2 UE receives downlink signal via NR operating band n1, 0.8 dB MSD is applied for a reference sensitivity which is used for receiving the downlink signal. In other words, 0.8 dB MSD may also be interpreted as reference sensitivity for NR operating band n1 for PC2 UE is 0.8 dB bigger than reference sensitivity for NR operating band n1 for PC3 UE.

For example, when the PC2 UE transmits uplink signal via NR operating band n3 and the PC2 UE receives downlink signal via NR operating band n3, 1.7 dB MSD is applied for a reference sensitivity which is used for receiving the downlink signal. In other words, 1.7 dB MSD may also be interpreted as reference sensitivity for NR operating band n3 for PC2 UE is 1.7 dB bigger than reference sensitivity for NR operating band n3 for PC3 UE.

Additionally, sensitivity degradation due to wide channel bandwidth needs to be considered for NR operating band n3.

1-4. Wide Channel Bandwidth Sensitivity Degradation Analysis in n3 Band

For the wide channel bandwidth (CBW) in n3 NR band, the sensitivity degradation needs to be analyzed to consider the counter IMD problem by CIMD5 impact in n3 received frequency band as shown in an example of FIG. 9.

Here, wide CBW may mean CBW equal to or bigger than 40 MHz.

The following drawings are prepared to explain a specific example of the present specification. Since the names of specific devices or names of specific signals/messages/fields described in the drawings are provided by way of example, technical features of the present specification are not limited to specific names used in the following drawings.

FIG. 9 illustrates an example of an impact of CIMD5 problem in NR band n3.

In FIG. 9, "Wanted" may mean UL signal that the UE wants to transmit. LO may mean signal generated by local oscillator (LO). "Image" may mean signal generated at the opposite point of the "Wanted" signal with respect to LO. "Image" signal is generated due to mixing of signal of LO and signal of "Wanted". BB may mean baseband bandwidth. BB may mean a difference between frequency position of LO and frequency position of "Wanted" signal.

CIM3 component is generated at a frequency position 3BB apart from frequency position of LO. CIM5 component is generated at a frequency position 5BB apart from frequency position of LO.

CIM5 in NR band n3 affects reception in Rx band.

To derive sensitivity degradation in n3 due to wide CBW, parameters in Table 17 are assumed to be used.

TABLE 17

| parameters | NR n3 band |
|---|---|
| Total NF (dB) | 9.00 |
| counter-intermodulation products CIM5 (dBc) | −60 |
| RFIC Noise for Rx band (dBm/Hz) | −150 |
| PA Noise for Rx band (dBm/Hz) | −122 |
| PA Gain for Rx band (dB) | 28 |
| Duplexer Tx/Rx isolation (dB) | 47 |
| RF Front-End Loss (dB) | 4 |
| Diversity gain (dB) | 3 |
| Antenna isolation (dB) | 10 |

An example of table 17 shows RF parameters according to each NR band.

The receiver sensitivity of PC2 REFSENS requirements will be impacted by duplexer isolation levels and increasing noise level by RFIC and PA for Rx band at antenna connector with respect to PC3 REFSENS requirements in each CBW.

Hence, the receiver sensitivity degradation will be derived based on the increasing noise level in Rx band by duplexer isolation and RFIC/PA noise due to CIM5 from PC2 transmission in FDD band.

The following REFSENS analysis an example for PC3 UE in n3 FDD NR band with 40 Mhz and 50 MHz CBW as reference point.

TABLE 18

|  | NR n3 band 40 MHz CBW | | NR n3 band 50 MHz CBW | |
|---|---|---|---|---|
|  | Main path | Diversity path | Main path | Diversity path |
| C/N requirement (dB) | −1.0 | −1.0 | −1.0 | −1.0 |
| Noise floor at Antenna connector(dBm/Hz) | −165.0 | −165.0 | −165.0 | −165.0 |
| Total NF(RFFE IL + RF NF) (dB) | 9.0 | 9.0 | 9.0 | 9.0 |
| CIM5 at Antenna connector (dBm/Hz) | −152.5 | −162.5 | −150.5 | −160.5 |
| RFIC RX Band Noise level at Antenna connector (dBm/Hz) | −161.5 | −171.5 | −161.5 | −171.5 |
| PA RX Band Noise level at Antenna connector (dBm/Hz) | −161.5 | −171.5 | −161.5 | −171.5 |

TABLE 18-continued

|  | NR n3 band 40 MHz CBW | | NR n3 band 50 MHz CBW | |
| --- | --- | --- | --- | --- |
|  | Main path | Diversity path | Main path | Diversity path |
| Total RXBN at Antenna connector (dBm/Hz) | −151.3 | −159.9 | −149.7 | −158.7 |
| Sensitivity with RXBN (PC3 max Tx power)(dBm/CBW) | −76.3 | −84.9 | −73.7 | −82.7 |
| After MRC | −85.5 (3.2 dB margin) | | −83.2 (3.5 dB margin) | |

Table 18 shows an example of REFSENS reference for PC3 FDD UE in each CBW (e.g. 40 MHz, 50 MHz).

Table 18 may be interpreted in a same way with Table 13.

Table 19 shows example of the expected sensitivity degradation to consider the counter IMD problem in wide CBW for PC2 UE for n3 band.

TABLE 19

|  | NR n3 band 40 MHz CBW | | NR n3 band 50 MHz CBW | |
| --- | --- | --- | --- | --- |
|  | Main path | Diversity path | Main path | Diversity path |
| C/N requirement (dB) | −1.0 | −1.0 | −1.0 | −1.0 |
| Noise floor at Antenna connector(dBm/Hz) | −165.0 | −165.0 | −165.0 | −165.0 |
| Total NF(RFFE IL + RF NF) (dB) | 9.0 | 9.0 | 9.0 | 9.0 |
| CIM5 at Antenna connector (dBm/Hz) | −149.5 | −159.5 | −147.5 | −157.5 |
| RFIC RX Band Noise level at Antenna connector (dBm/Hz) | −160.0 | −170.0 | −160.0 | −170.0 |
| PA RX Band Noise level at Antenna connector (dBm/Hz) | −160.0 | −170.0 | −160.0 | −170.0 |
| Total RXBN at Antenna connector (dBm/Hz) | −148.7 | −157.9 | −147.0 | −156.4 |
| Sensitivity with RXBN (PC2 max Tx power)(dBm/CBW) | −73.7 | −82.8 | −71.0 | −80.4 |
| After MRC | −83.3 dBm −> 2.12 dB MSD is needed | | −80.9 dBm −> 2.36 dB MSD is needed | |

Table 19 shows an example of Sensitivity degradation for PC2 FDD UE in each CBW (40 MHz, 50 MHz).

CIM5 may be increased when UE Tx power increases. The example of Table 18 shows an example of CIM 5 level for PC3 UE using FDD, and the example of Table 18 is based on PC2 UE using FDD. In table 19, because Tx power of PC2 UE is 3 dB bigger than Tx power of PC3 UE, it is assumed that CIM5 level is increased by 3 dB, and it is assumed that PA occurred in RFIC and RFIC Rx noise power level are increased by 1.5 dB. Table 19 shows an example of MSD determined by analyzing total noise based on a summation of noises occurred by each of parameters.

Compared to table 18, 1.5 dB increase in noise level is applied to RFIC RX Band Noise level at Antenna connector and PA RX Band Noise level at Antenna connector. Both RFIC RX Band Noise level at Antenna connector and PA RX Band Noise level at Antenna connector are increased by 1.5 dB compared to table 18. 1.5 dB is increased based on noise effect due to CIM 5 based on wide bandwidth of 40 MHz and/or 50 MHz Compared to table 18, 3 dB is increased for CIM5 at Antenna connector.

For NR band n1, comparing −83.3 dBm of table 19 and −85.5 dBm of table 18, 2.12 dB MSD is needed. For NR band n3, comparing −80.9 dBm of table 19 and −83.2 dBm of table 18, 2.36 dB MSD is needed.

Based on the example of Table 19, the following observations are derived:

Observation 8: In 40 MHz CBW, the 2.12 dB MSD is needed when PC2 transmission in n3 FDD band.

Observation 9: In 50 MHz CBW, the 2.36 dB MSD is needed when PC2 transmission in n3 FDD band.

Based on analysis based on various examples, such as description in section 1-1 to section 1-3, the present disclosure proposes the followings:

To reduce the sensitivity degradation in n3 band and/or n1 band, filter vendor shall keep or enhance the duplexer Tx/Rx isolation level for FDD bands to support PC2 UE.

Based on RF component improvement, sensitivity degradation requirements may be studied when RF component vendor can provide these commercial Duplexer, PAs and RFICs for PC2 UE in FDD band in future.

To reduce the sensitivity degradation in n3/n1 band, filter vendor shall keep or enhance the duplexer Tx/Rx isolation level.

RF component vendor's opinions may be considered when vendors can support the enhanced RF component performance such as RFIC, duplexer and PAs to support PC2 UE in FDD band.

Sensitivity degradation requirements can be further studied when RF component vendor provide these commercial Duplexer, PAs and RFICs for PC2 UE in FDD band. The above examples of MSD results in the present disclosure can be considered as baseline to derive MSD requirements in future.

Based on the analysis of receiver sensitivity degradation for PC2 UE in FDD band, the present disclosure provides observation and proposal as follow:

Sensitivity degradation for PC2 may be derived based on the REFSENS requirements for PC3.

When PC2 (26 dBm) UE is allowed in FDD band, then sensitivity degradation should be considered since Duplexer Tx/Rx isolation levels will increase about 2 dB by 3 dB Transmission power boosting. Then it would affect the sensitivity degradation compare to PC3 duplexer in n3.

Also, the increased noise level in Rx band by RFIC/PA operation for PC2 UE in FDD band should be considered to derive sensitivity degradation for each FDD band.

In n3 FDD band, the 0.9 dB MSD is needed when Duplexer isolation characteristic is decreased 2 dB compare to current filter characteristics.

In n1 FDD band, the 0.4 dB MSD is needed when Duplexer isolation characteristic is decreased 2 dB compare to current filter characteristics.

Even though duplexer isolation level is maintained or the Tx/Rx isolation level is enhanced, the raised leakage problem in Rx band by RFIC/PA operation in FDD band will be impacted to the sensitivity degradation in FDD band.

In n3 FDD band, the 0.7 dB MSD is needed when assume noise level might be increased about 1.5 dB in Rx band by RFIC/PA operation.

In n1 FDD band, the 0.3 dB MSD is needed when assume noise level might be increased about 1.5 dB in Rx band by RFIC/PA operation.

In n3 FDD band, the 1.7 dB MSD is needed when both Duplexer isolation characteristic (2 dB relaxation) and increased noise level (1.5 dB) in Rx band by RFIC/PA operation for PC2 FDD UE.

In n1 FDD band, the 0.8 dB MSD is needed when both duplexer isolation characteristic (2 dB relaxation) and increased noise level (1.5 dB) in Rx band by RFFIC/PA operation for PC2 FDD UE.

In 40 MHz CBW in n3 FDD band, the 2.12 dB MSD is needed when PC2 transmission in n3 NR band.

In 50 MHz CBW in n3 FDD band, the 2.36 dB MSD is needed when PC2 transmission in n3 NR band.

To reduce the sensitivity degradation in n3/n1 band, filter vendor shall keep or enhance the duplexer Tx/Rx isolation level.

RF component vendor's opinions may be considered when vendors can support the enhanced RF component performance such as RFIC, duplexer and PAs to support PC2 UE in FDD band.

Sensitivity degradation requirements can be further studied when RF component vendor provide these commercial Duplexer, PAs and RFICs for PC2 UE in FDD band. The above examples of MSD results in the present disclosure can be considered as baseline to derive MSD requirements in future.

For reference, ±α tolerance may be applied to the MSD values shown in the present disclosure. For example, α is 0, 0.1, 0.2, 0.3, 0.4, 0.5, 0.6, 0.7, . . . may be 2.0. That is, the range of MSD values proposed in the present specification may include MSD values to which a tolerance of ±α is applied. The tolerance value may be determined in a unit of 0.1 dB differences according to characteristics of RF components.

The following drawings are prepared to explain a specific example of the present specification. Since the names of specific devices or names of specific signals/messages/fields described in the drawings are provided by way of example, technical features of the present specification are not limited to specific names used in the following drawings.

Figure 10:
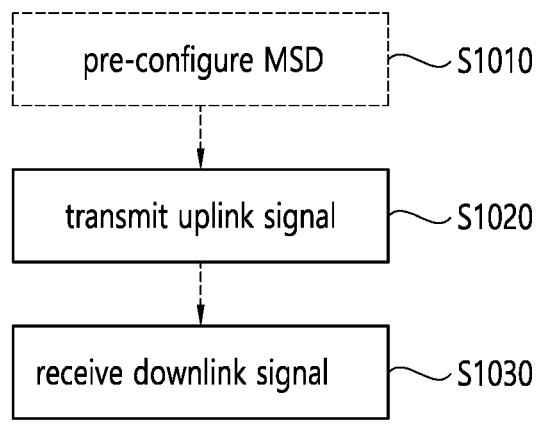
FIG. 10 is a flow chart showing an example of a procedure of a UE according to the present disclosure.

FIG. 10 is a flow chart showing an example of a procedure of a UE according to the present disclosure.

Referring to FIG. 10, steps S1010 to S1030 are shown. Operations described below may be performed by the UE (for example, the first device 100 of FIG. 2).

For reference, step S1010 may not always be performed when the UE performs communication. For example, step S1010 may be performed only when the reception performance of the UE is tested.

In the UE performing the operation of FIG. 10, NR operating band n1 and/or n3 may be configured for communication. The UE may be a PC2 UE.

In step S1010, the UE may preconfigure the MSD value. For example, the UE may preset the MSD values in Table 13, 14, 15, 16, 18, and/or 19.

In step S1020, the UE may transmit the uplink signal.

In step S1030, the UE may receive the downlink signal.

The UE may receive the downlink signal based on the reference sensitivity of the downlink band, to which the MSD value (for example, MSD values shown in examples of Table 14, Table 15, Table 16 and/or Table 19) is applied. For example, predetermined value of MSD is applied to a reference sensitivity used for the receiving of the downlink signal.

Based on that the UE is PC2 UE and the NR operating band n1, which is FDD band, is used for the uplink signal and the downlink signal, the predetermined value of the MSD may be 0.8 dB.

Based on that the UE is PC2 UE and the NR operating band n3, which is FDD band, is used for the uplink signal and the downlink signal and based on that the CBW is 10 MHz, the predetermined value of the MSD may be 1.7 dB.

Based on that the UE is PC2 UE and the NR operating band n3, which is FDD band, is used for the uplink signal and the downlink signal and based on that the CBW is 40 MHz, the predetermined value of the MSD may be 2.12 dB.

Based on that the UE is PC2 UE and the NR operating band n3, which is FDD band, is used for the uplink signal and the downlink signal and based on that the CBW is 50 MHz, the predetermined value of the MSD may be 2.36 dB.

For reference, the order in which steps S1020 and S1030 are performed may be different from that shown in FIG. 10. For example, step S1030 may be performed first and then step S1020 may be performed. Alternatively, step S1020 and step S1030 may be performed simultaneously. Alternatively, the time when step S1020 and step S1030 may be may overlap partially.

Hereinafter, an apparatus (for example, UE) in a wireless communication system, according to some embodiments of the present disclosure, will be described.

For example, the apparatus may include at least one processor, at least one transceiver, and at least one computer memory.

For example, the at least one computer memory operably connectable to the at least one processor and storing instructions that, based on being executed by the at least one processor, perform operations comprising: transmitting an uplink signal based on New Radio (NR) operating band n1, which is FDD band, wherein the UE is PC2 UE supporting 26 dBm of maximum output power; and receiving a downlink signal based on the NR operating band n1, wherein a predetermined value of MSD is applied to a reference sensitivity used for the receiving of the downlink signal, and wherein the predetermined value of the MSD is 0.8 dB, based on that the UE is PC2 UE and the NR operating band n1 is used for the uplink signal and the downlink signal.

Hereinafter, a processor for in a wireless communication system, according to some embodiments of the present disclosure, will be described.

The processor may be configured to perform operations comprising: transmitting an uplink signal based on New Radio (NR) operating band n1, which is FDD band, wherein the UE is PC2 UE supporting 26 dBm of maximum output power; and receiving a downlink signal based on the NR operating band n1, wherein a predetermined value of MSD is applied to a reference sensitivity used for the receiving of the downlink signal, and wherein the predetermined value of the MSD is 0.8 dB, based on that the UE is PC2 UE and the NR operating band n1 is used for the uplink signal and the downlink signal.

Hereinafter, a non-transitory computer-readable medium has stored thereon a plurality of instructions in a wireless communication system, according to some embodiments of the present disclosure, will be described.

According to some embodiment of the present disclosure, the technical features of the present disclosure could be embodied directly in hardware, in a software executed by a processor, or in a combination of the two. For example, a method performed by a wireless device in a wireless communication may be implemented in hardware, software, firmware, or any combination thereof. For example, a software may reside in RAM memory, flash memory, ROM memory, EPROM memory, EEPROM memory, registers, hard disk, a removable disk, a CD-ROM, or any other storage medium.

Some example of storage medium is coupled to the processor such that the processor can read information from the storage medium. In the alternative, the storage medium may be integral to the processor. The processor and the storage medium may reside in an ASIC. For other example, the processor and the storage medium may reside as discrete components.

The computer-readable medium may include a tangible and non-transitory computer-readable storage medium.

For example, non-transitory computer-readable media may include random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, or any other medium that can be used to store instructions or data structures. Non-transitory computer-readable media may also include combinations of the above.

In addition, the method described herein may be realized at least in part by a computer-readable communication medium that carries or communicates code in the form of instructions or data structures and that can be accessed, read, and/or executed by a computer.

According to some embodiment of the present disclosure, a non-transitory computer-readable medium has stored thereon a plurality of instructions. The stored a plurality of instructions may be executed by a processor of a UE.

For example, the stored a plurality of instructions may cause the UE to perform operations comprising: transmitting an uplink signal based on New Radio (NR) operating band n1, which is FDD band, wherein the UE is PC2 UE supporting 26 dBm of maximum output power; and receiving a downlink signal based on the NR operating band n1, wherein a predetermined value of MSD is applied to a reference sensitivity used for the receiving of the downlink signal, and wherein the predetermined value of the MSD is 0.8 dB, based on that the UE is PC2 UE and the NR operating band n1 is used for the uplink signal and the downlink signal.

According to some embodiment of the present disclosure, the PC2 UE may efficiently and/or precisely perform communication based on FDD operating bands. For example, the impact of self interference on FDD band for PC 2 UE is analyzed. Also, the degree of reception sensitivity relaxation in the case where desensing occurs is analyzed. Also, effect CIMD problem occurs in FDD band is analyzed. Also, MSD values applied to reference sensitivity for receiving the downlink signal are clearly determined.

In the above exemplary systems, although the methods have been described on the basis of the flowcharts using a series of the steps or blocks, the present disclosure is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present disclosure.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

Claims in the present disclosure can be combined in a various way. For instance, technical features in method claims of the present disclosure can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A User Equipment (UE) for performing communication, the UE comprising:
   at least one transceiver;
   at least one processor; and
   at least one computer memory operably connectable to the at least one processor and storing instructions that, based on being executed by the at least one processor, perform operations comprising:
   receiving a downlink signal based on New Radio (NR) operating band n3, which is Frequency Division Duplex (FDD) band,
   wherein the UE is a power class 2 (PC2) UE related to 26 dBm of maximum output power,
   wherein the at least one transceiver is configured to satisfy requirements based on a reference sensitivity for the receiving of the downlink signal,
   wherein a degradation is allowed to the reference sensitivity,
   wherein a maximum amount of the degradation for the NR operating band n3 is based on channel bandwidth (CBW), and wherein the maximum amount of the degradation is 2.8 dB for the CBW being 50 MHz, based on that the UE is the PC2 UE, and the NR operating band n3 is used for the downlink signal.

2. The UE of claim 1,
wherein the maximum amount of the degradation is 0.5 dB for the CBW being 10 MHz, based on that the UE is the PC2 UE, and the NR operating band n3 is used for the downlink signal.

3. The UE of claim 1,
wherein the maximum amount of the degradation is 1.5 dB for the CBW being 40 MHz, based on that the UE is the PC2 UE, and the NR operating band n3 is used for the downlink signal.

4. The UE of claim 1,
wherein the NR operating band n3 includes an uplink band with a frequency range of 1710 MHz to 1785 MHz and a downlink band with a frequency range of 1805 MHz to 1880 MHz.

5. A method comprising:
receiving a downlink signal based on New Radio (NR) operating band n3, which is Frequency Division Duplex (FDD) band,
wherein a User Equipment (UE) is a power class 2 (PC2) UE related to 26 dBm of maximum output power,
wherein the UE is configured to satisfy requirements based on a reference sensitivity for the receiving of the downlink signal,
wherein a degradation is allowed to the reference sensitivity,
wherein a maximum amount of the degradation for the NR operating band n3 is based on channel bandwidth (CBW), and
wherein the maximum amount of the degradation is 2.8 dB for the CBW being 50 MHz, based on that the UE is the PC2 UE, and the NR operating band n3 is used for the downlink signal.

6. The method of claim 5,
wherein the maximum amount of the degradation is 0.5 dB for the CBW being 10 MHz, based on that the UE is the PC2 UE, and the NR operating band n3 is used for the downlink signal.

7. The method of claim 5,
wherein the maximum amount of the degradation is 1.5 dB for the CBW being 40 MHz, based on that the UE is the PC2 UE, and the NR operating band n3 is used for the downlink signal.

8. The method of claim 5,
wherein the maximum amount of the degradation is 2.8 dB for the CBW being 50 MHz, based on that the UE is the PC2 UE, and the NR operating band n3 is used for the downlink signal.

9. The method of claim 5,
wherein the NR operating band n3 includes an uplink band with a frequency range of 1710 MHz to 1785 MHz and a downlink band with a frequency range of 1805 MHz to 1880 MHz.

* * * * *